United States Patent
Esmaelion et al.

(10) Patent No.: US 11,896,920 B2
(45) Date of Patent: *Feb. 13, 2024

(54) FABRICATION OF TRAGACANTHIN-PVA NANOFIBROUS WEBS AND APPLICATIONS THEREOF IN WATER-ABSORBENT FILTERS

(71) Applicants: Fatemeh Esmaelion, Tehran (IR); Hossein Tavanai, Isfahan (IR); Ali Akbar Miran Beigi, Tehran (IR); Mehdi Bazarganipour, Isfahan (IR); Mohammad Agha Morshed, Belmont, CA (US); Zhinoos Javadi, Isfahan (IR)

(72) Inventors: Fatemeh Esmaelion, Tehran (IR); Hossein Tavanai, Isfahan (IR); Ali Akbar Miran Beigi, Tehran (IR); Mehdi Bazarganipour, Isfahan (IR); Mohammad Agha Morshed, Belmont, CA (US); Zhinoos Javadi, Isfahan (IR)

(73) Assignee: ISFAHAN UNIVERSITY OF TECHNOLOGY, Isfahan (IR)

(*) Notice: Subject to any disclaimer, the term of this patent is extended or adjusted under 35 U.S.C. 154(b) by 635 days.

This patent is subject to a terminal disclaimer.

(21) Appl. No.: 16/942,052

(22) Filed: Jul. 29, 2020

(65) Prior Publication Data

US 2020/0354857 A1    Nov. 12, 2020

Related U.S. Application Data

(60) Provisional application No. 62/880,102, filed on Jul. 30, 2019.

(51) Int. Cl.
*B29C 70/88* (2006.01)
*B29C 71/02* (2006.01)
(Continued)

(52) U.S. Cl.
CPC ......... *B01D 39/1615* (2013.01); *B01D 39/10* (2013.01); *B29C 70/688* (2013.01);
(Continued)

(58) Field of Classification Search
CPC ....... B29C 70/68; B29C 70/688; B29C 70/88; B29C 71/02; B29K 2005/00;
(Continued)

(56) References Cited

U.S. PATENT DOCUMENTS

2008/0110342 A1 * 5/2008 Ensor .................. D01D 5/0076
264/484 X
2010/0216211 A1 * 8/2010 Shauer ................ D01D 5/0038
264/465 X
(Continued)

FOREIGN PATENT DOCUMENTS

JP      2015113293 A * 6/2015 .............. B32B 5/26

OTHER PUBLICATIONS

Translation of JP 2015113293 A (published on Jun. 22, 2015).*

*Primary Examiner* — Leo B Tentoni
(74) *Attorney, Agent, or Firm* — Bajwa IP Law Firm; Haris Zaheer Bajwa

(57) ABSTRACT

A fabrication method for a filter containing tragacanthin-polyvinyl alcohol (PVA) nanofibers includes obtaining a homogenous tragacanthin-PVA solution by obtaining a PVA solution by dissolving PVA in distilled water, and adding tragacanthin to the PVA solution. The method may further include obtaining a support layer by coating a stainless steel mesh with a thin layer of a hydrophobic polymer, coating a stainless steel mesh with the thin layer of the hydrophobic polymer comprising electrospinning a hydrophobic polymer solution onto the stainless steel mesh, and forming a traga-
(Continued)

canthin-PVA nanofibrous web on the support layer by electrospinning the homogenous tragacanthin-PVA solution onto the support layer.

17 Claims, 39 Drawing Sheets

(51) Int. Cl.

| | | |
|---|---|---|
| C08L 29/04 | (2006.01) | |
| D01D 10/02 | (2006.01) | |
| D01D 11/06 | (2006.01) | |
| D01F 6/50 | (2006.01) | |
| D01F 9/00 | (2006.01) | |
| B01D 39/16 | (2006.01) | |
| B01D 39/10 | (2006.01) | |
| D01D 5/00 | (2006.01) | |
| D01F 1/10 | (2006.01) | |
| D04H 1/4309 | (2012.01) | |
| D04H 1/728 | (2012.01) | |
| D01D 5/08 | (2006.01) | |
| D01F 1/00 | (2006.01) | |
| B29C 70/68 | (2006.01) | |
| B82Y 30/00 | (2011.01) | |
| B82Y 40/00 | (2011.01) | |
| B29L 31/14 | (2006.01) | |
| B32B 5/26 | (2006.01) | |
| B29K 33/20 | (2006.01) | |
| C08B 37/00 | (2006.01) | |
| B29K 29/00 | (2006.01) | |

(52) U.S. Cl.
CPC ........... *D01D 5/003* (2013.01); *D01D 5/0038* (2013.01); *D01D 5/0076* (2013.01); *D01D 5/0084* (2013.01); *D01D 5/08* (2013.01); *D01F 1/00* (2013.01); *D01F 1/10* (2013.01); *D04H 1/4309* (2013.01); *D04H 1/728* (2013.01); *B01D 2201/0415* (2013.01); *B01D 2239/025* (2013.01); *B01D 2239/0478* (2013.01); *B01D 2239/0631* (2013.01); *B01D 2239/0654* (2013.01); *B01D 2239/10* (2013.01); *B29K 2005/00* (2013.01); *B29K 2029/04* (2013.01); *B29K 2033/20* (2013.01); *B29L 2031/14* (2013.01); *B32B 5/265* (2021.05); *B32B 5/266* (2021.05); *B82Y 30/00* (2013.01); *B82Y 40/00* (2013.01); *C08B 37/006* (2013.01); *D10B 2505/04* (2013.01)

(58) Field of Classification Search
CPC ............ B29K 2029/04; B29K 2033/20; B29L 2031/14; B32B 5/26; B32B 5/265; B32B 5/266; C08B 37/006; C08L 29/04; D01D 5/0007; D01D 5/0015; D01D 5/003; D01D 5/0038; D01D 5/0076; D01D 5/0084; D01D 10/02; D01D 11/06; D01F 6/50; D01F 9/00; D10B 2505/04
USPC ............ 264/135, 171.1, 236, 258, 259, 330, 264/331.15, 331.19, 464, 465, 466, 484; 525/56; 536/114
See application file for complete search history.

(56) References Cited

U.S. PATENT DOCUMENTS

2012/0027838 A1* 2/2012 Gordon ..................... D01F 9/00
426/531
2016/0168755 A1* 6/2016 Toyoda ................ D01D 5/0076
264/465 X

* cited by examiner

FABRICATION OF TRAGACANTHIN-PVA NANOFIBROUS WEBS AND APPLICATIONS THEREOF IN WATER-ABSORBENT FILTERS

CROSS-REFERENCE TO RELATED APPLICATION

This application claims the benefit of priority from U.S. Provisional Patent Application Ser. No. 62/880,102, filed on Jul. 30, 2019, and entitled "FABRICATION OF TRAGACANTH (100%) AND TRAGACANTHIN (UP TO 90%) NANOFIBERS THROUGH ELECTRO SPINNING AND SEPARATION OF WATER FROM PETROLEUM PRODUCTS BY THEM," which is incorporated herein by reference in its entirety.

TECHNICAL FIELD

The present disclosure relates to nanofibrous structures derived from the natural gum of pure tragacanth. More particularly, the present disclosure is directed to the fabrication of tragacanthin-PVA nanofibrous structures and applications thereof as a water-absorbent filter.

BACKGROUND

Natural gums are mainly composed of polysaccharides and may be extracted from scratched barks of various trees and plants. Polysaccharides are substances with a high molecular weight and may be soluble or at least may be dispersible in water. Often, fabricating nanofibers by electrospinning polysaccharides and protein compounds with a bacterial and herbal origin is very difficult due to repulsive effects between polyanions and polycations of polymeric chains in solutions. As a result, practical applications of polysaccharide nanofibers may be limited. One way to solve the aforementioned problem may be to mix polysaccharides with a synthetic polymer.

Tragacanth is a natural gum that consists of two major parts, namely, tragacanthin (D-galacturonic acid) and bassorin (a series of methoxylated acids). Tragacanthin, which is a neutral polymer of high molecular weight, is soluble in water, forming a viscous solution. Bassorin is a complex, heterogeneous and anionic carbohydrate with good stability against heat, acids and aging. This natural biocompatible polymer is insoluble in water and forms a gel or a viscous suspension. Accordingly, it may be practically impossible to use tragacanth in concentrations above 1 percent for electrospinning.

Production of nanofibers from tragacanth is not easy due to the high viscosity of the aqueous solution of tragacanth, polyanionic structure of tragacanth, and repulsion between polyanion molecules along the molecular chains of tragacanth. the high viscosity of the aqueous solution of tragacanth may prevent formation of a stable and continuous flow of the aqueous solution of tragacanth from a nozzle tip to a collector of an electrospinning apparatus. Addition of a synthetic polymer to a tragacanth solution may reduce the repulsion between anionic sites and may improve the electrospinning potential of tragacanth.

Pure tragacanth nanofibers may not be electrospun due to the above-mentioned properties of tragacanth and lack of a suitable solution for electrospinning. To address this problem, polyvinyl alcohol has been used as an auxiliary polymer to improve the electrospinning of tragacanth. Despite the use of this auxiliary polymer, electrospinning of uniform and beadless nanofibers with over 40% tragacanth, has not yet been successful. There is, therefore, a need for making electrospinning of pure tragacanth and tragacanthin possible. There is further a need for fabricating pure tragacanth and tragacanthin nanofibers which may then serve as hydrophilic layers in water-absorbent filters in the petroleum industry.

Crude petroleum extracted from petroleum fields may contain some saltwater. Saltwater consists of free water, emulsion water, and suspension water. Free water may be separated from crude oil by separators in a short time. In the next stages, residual free water, emulsion water, and suspension water may be subjected to electrostatic and electrochemical separation processes by utilizing emulsifiers, heat, and centrifugation. However, after being refined, crude petroleum may still contain a small amount of water. This remaining emulsified water, which is regarded as an integral part of all petroleum products, may cause serious problems such as freezing water droplets in an aircraft fuel at high altitudes. Moreover, the presence of water droplets in petroleum products can cause oxidation, reducing life spans of oil products. There is, therefore, a need for developing water absorbent materials that may be utilized in separating water from petroleum products.

Filters based on nanofibers are suitable for use in high volume filtration applications such as liquid-liquid separation methods, thanks to properties such as low base weight, high permeability, and small pore size. Hydrophilic polymers such as polyvinyl alcohol have already been used to provide water-absorbent filters for separating water from petroleum and petroleum products. However, there is still a need for a biocompatible and hydrophilic polymer that may be utilized for fabrication of a water-absorbent filter for separation of water from oil products. There is further a need for a method for fabricating biocompatible and hydrophilic nanofibers with very high specific surfaces.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a method for fabricating a filter containing tragacanthin-polyvinyl alcohol (PVA) nanofibers. An exemplary method may include obtaining a homogenous tragacanthin-PVA solution by obtaining a PVA solution by dissolving PVA in distilled water, and adding tragacanthin to the PVA solution. An exemplary method may further include obtaining a support layer by coating a stainless steel mesh with a thin layer of a hydrophobic polymer, and forming a tragacanthin-PVA nanofibrous web on the support layer by electrospinning the homogenous tragacanthin-PVA solution onto the support layer.

According to one or more exemplary embodiments, the present disclosure is directed to a filter for separating water. An exemplary filter for separating water may include a support layer comprising a stainless steel mesh coated with a hydrophobic polymer, and a water-absorbing layer that may include a tragacanthin-PVA nanofibrous web. An exemplary tragacanthin-PVA nanofibrous web may be electrospun onto an exemplary support layer. According to one or more exemplary embodiments, the present disclosure is directed to a method for separating water from a fluid feed. An exemplary method may include forming a water-absorbent filter by obtaining a homogenous tragacanthin-polyvinyl alcohol (PVA) solution. Obtaining a homogenous tragacanthin-polyvinyl alcohol (PVA) solution may include obtaining a PVA solution by dissolving PVA in distilled water, and adding tragacanthin to the PVA solution. An exemplary method may further include obtaining a support layer by coating a stainless steel mesh with a thin layer of a hydrophobic polymer, the coating a stainless steel mesh with the thin layer of the hydrophobic polymer comprising electrospinning a hydrophobic polymer solution onto the stainless steel mesh, and forming a tragacanthin-PVA nanofibrous web on the support layer by electrospinning the homogenous tragacanthin-PVA solution onto the support layer. An exemplary method may further include forcing the fluid feed to pass through the water-absorbent filter.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which.

DETAILED DESCRIPTION

Figure 1:
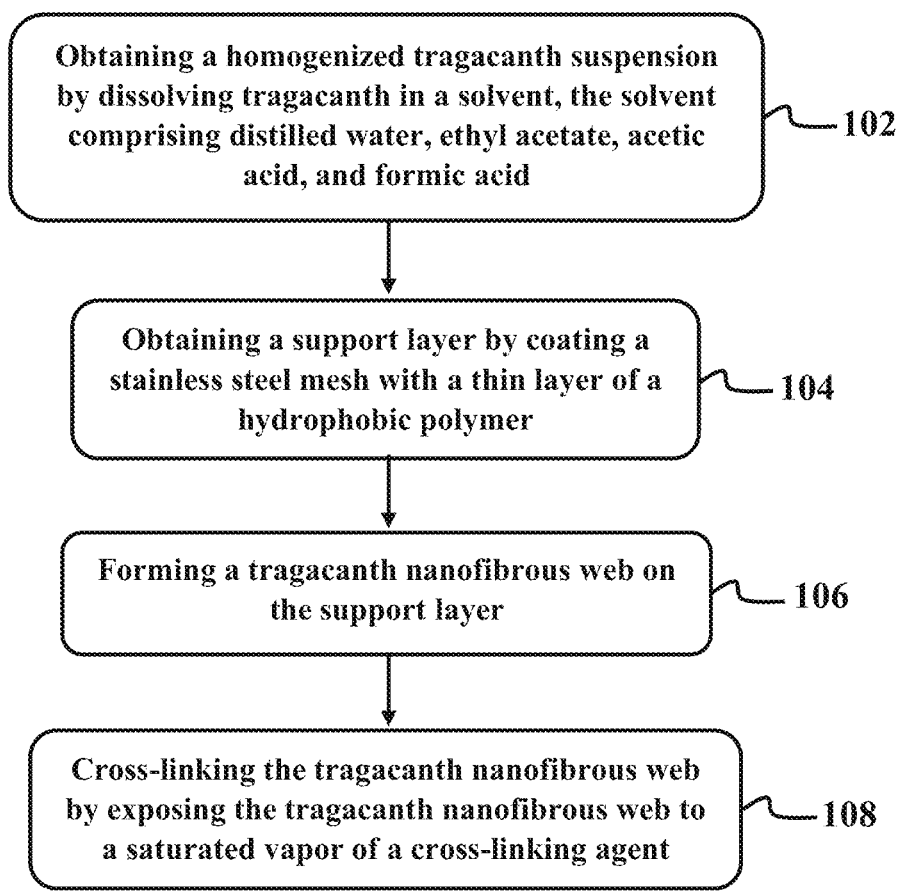
FIG. 1 illustrates a method for fabricating a filter containing pure tragacanth nanofibers, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of a method for fabricating a water-absorbent filter containing pure tragacanth nanofibres. Tragacanth is highly hydrophilic and therefore is a promising candidate for fabricating water-absorbent filters. However, fabricating pure tragacanth nanofibres utilizing an electrospinning apparatus is very difficult due to the high viscosity of the aqueous solution of tragacanth, polyanionic structure of tragacanth, and repulsion between polyanion molecules along the molecular chains of tragacanth. The high viscosity of the aqueous solution of tragacanth may prevent formation of a stable and continuous flow of the aqueous solution of tragacanth from a nozzle tip to a collector of an electrospinning apparatus. In an exemplary embodiment, an exemplary solvent system including distilled water, formic acid, acetic acid, and ethyl acetate may be utilized for dissolving pure tragacanth and forming a spinning solution that may be easily electrospun onto an exemplary support layer. In an exemplary embodiment, an exemplary support layer may include a stainless steel mesh coated with a hydrophobic polymer. Specifically, utilizing an exemplary solvent system that may include distilled water, formic acid, acetic acid, and ethyl acetate may aid in improving the electrospinning properties of pure tragacanth. Improving the electrospinning properties of pure tragacanth may refer to reducing the viscosity of pure tragacanth solution, such that electrospinning of the exemplary pure tragacanth may be possible.

The present disclosure is further directed to exemplary embodiments of a method for fabricating a water-absorbent filter containing tragacanthin-polyvinyl alcohol (PVA) nanofibres. In an exemplary embodiment, tragacanthin which is the water-soluble part of tragacanth may be electrospun with the aid of a polymer such as PVA. As mentioned before, electrospinning of pure tragacanthin is nearly impossible due to relatively high viscosities of pure tragacanthin aqueous solutions. In an exemplary embodiment, tragacanthin may be added to a PVA solution to obtain a spinning solution containing tragacanthin-PVA suspension. An exemplary tragacanthin-PVA suspension may easily be electrospun utilizing an electrospinning apparatus.

In exemplary embodiments of the present disclosure, the exemplary nanofibres made of pure tragacanth and tragacanthin-PVA may be utilized as water-absorbent filters for separating water from fluid feeds. In an exemplary embodiment, the exemplary nanofibres of pure tragacanth and tragacanthin-PVA which are electrospun on a support layer may function as water-absorbent filters that may be utilized for separating water from petroleum samples. In an exemplary embodiment, fabricating a water-absorbent filter containing pure tragacanth nanofibrous webs or tragacanthin-PVA nanofibrous webs may significantly enhance the hydrophilicity of the exemplary water-absorbent filter due to considerably high hydrophilic properties of pure tragacanth and tragacanthin.

FIG. 1 illustrates a method 100 for fabricating a filter containing pure tragacanth nanofibers, consistent with one or more exemplary embodiments of the present disclosure. In an exemplary embodiment, method 100 may include a step 102 of obtaining a homogenized tragacanth suspension by dissolving tragacanth in a solvent, where the solvent may include distilled water, ethyl acetate, acetic acid, and formic acid, a step 104 of obtaining a support layer by coating a stainless steel mesh with a thin layer of a hydrophobic polymer, a step 106 of forming a tragacanth nanofibrous web on the support layer by electrospinning the homogenized tragacanth suspension onto the support layer, and a step 108 of cross-linking the tragacanth nanofibrous web by exposing the tragacanth nanofibrous web to a saturated vapor of a cross-linking agent.

In an exemplary embodiment, step 102 of obtaining a homogenized tragacanth suspension by dissolving tragacanth in a solvent, where the solvent may include distilled water, ethyl acetate, acetic acid, and formic acid may include dissolving tragacanth in a solvent, where the solvent may include 52 to 53 vol. % of distilled water, 17-23 vol. % of ethyl acetate, 16 to 22 vol. % of acetic acid, and a remaining amount of an exemplary solvent may include formic acid. In an exemplary embodiment, dissolving tragacanth in the solvent may include obtaining a first solution by dissolving tragacanth in distilled water, obtaining a second solution by adding formic acid, then acetic acid, and then ethyl acetate to the first solution, and homogenizing the second solution. In an exemplary embodiment, forming the homogenized tragacanth suspension may include dissolving tragacanth in a four-part solvent that may contain distilled water, ethyl acetate, acetic acid, and formic acid with a volumetric ratio of 7:1:2:3 (distilled water:formic acid:acetic acid:ethyl acetate). In an exemplary embodiment, forming the homogenized tragacanth suspension may include dissolving tragacanth in a four-part solvent that may contain distilled water, ethyl acetate, acetic acid, and formic acid with a volumetric ratio of 6:1:3:2 (distilled water:formic acid:acetic acid:ethyl acetate). In an exemplary embodiment, the homogenized tragacanth suspension may be formed such that a concentration of tragacanth in the homogenized tragacanth suspension may be between 1 w/v % and 1.7 w/v %.

In an exemplary embodiment, obtaining a homogenized tragacanth suspension may include adding pure tragacanth powder to distilled water in a homogenizer. An exemplary homogenizer may include a stirrer, such as a magnetic stirrer or an ultrasound homogenizer. For example, a magnetic stirrer may be utilized to homogenize the exemplary suspension of pure tragacanth in distilled water by stirring the exemplary suspension. After that, formic acid may be added to the exemplary suspension followed by stirring the suspension. Then, acetic acid may be added to the exemplary suspension followed by stirring the suspension, and finally, ethyl acetate may be added to the exemplary suspension. To reach complete dissolution of pure tragacanth in the exemplary solvent, the final exemplary tragacanth suspension may be homogenized by, for example, stirring the final exemplary tragacanth suspension at ambient temperature for at least 3 days. In an exemplary embodiment, stirring the final exemplary tragacanth suspension may include stirring the final exemplary tragacanth suspension at ambient temperature for a duration of 3 to 5 days.

Figure 2:
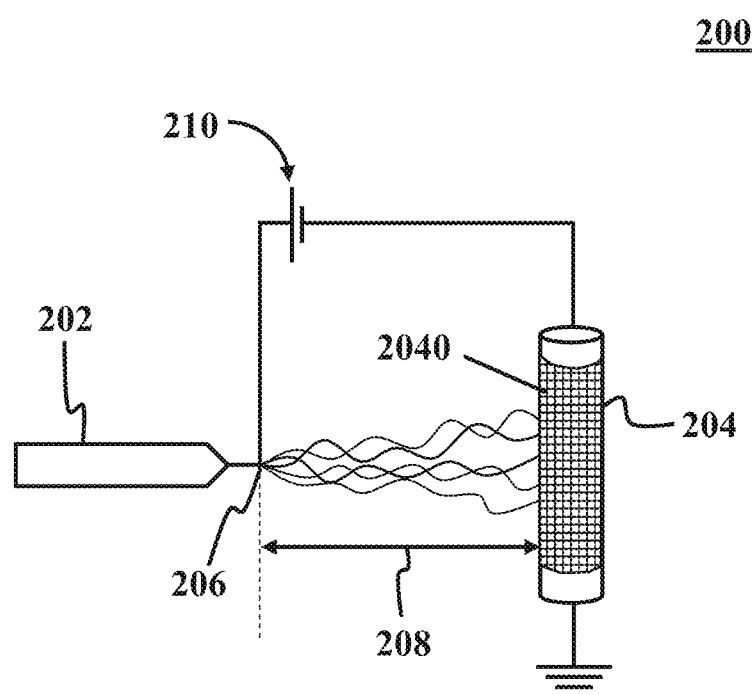
FIG. 2 illustrates an electrospinning apparatus, consistent with one or more exemplary embodiments of the present disclosure.

In an exemplary embodiment, step 104 of obtaining a support layer by coating a stainless steel mesh with a thin layer of a hydrophobic polymer may include electrospinning a hydrophobic polymer solution onto the stainless steel mesh. FIG. 2 illustrates an electrospinning apparatus 200, consistent with one or more exemplary embodiments of the present disclosure. In an exemplary embodiment, apparatus 200 may include an electrospinning nozzle 202 that may be utilized for injecting an exemplary spinning solution and a collector 204 placed in front of nozzle 202 at a distance 208. In an exemplary embodiment, distance 208 may be adjustable. A power supply system 210 connected to both nozzle 202 and collector 204 may apply a predetermined potential difference between a tip 206 of nozzle 202 and collector 204. In an exemplary embodiment, collector 204 may be grounded. In an exemplary embodiment, a hydrophobic polymer, such as polyacrylonitrile (PAN) may be electrospun onto a stainless steel mesh 2040 from an electrospinning nozzle such as nozzle 202 with a flow rate between 0.025 $cm^3$ $hr^{-1}$ and 0.25 $cm^3$ $hr^{-1}$ onto stainless steel mesh 2040. Stainless steel mesh 2040 may be mounted on a collector such as collector 204 which may be positioned at distance 208. In an exemplary embodiment, distance 208 may be between 5 cm and 15 cm from tip 206 of electrospinning nozzle 202. A power supply system such as power supply system 210 may apply a voltage between 10 kV and 15 kV between nozzle tip 206 and stainless steel mesh 2040 mounted on collector 204.

In an exemplary embodiment, step 106 may include forming a tragacanth nanofibrous web on the support layer by electrospinning the homogenized tragacanth suspension onto the support layer. In an exemplary embodiment, an electrospinning apparatus similar to electrospinning apparatus 200 may be utilized for electrospinning the homogenized tragacanth suspension onto the support layer (not illustrated). The exemplary homogenized tragacanth suspension may be electrospun onto the exemplary support layer from nozzle 202 with a flow rate between 0.0125 and 0.0375 $cm^3$ $hr^{-1}$ onto the support layer attached on collector 204, the support layer may be positioned at distance 208 from nozzle tip 206. In an exemplary embodiment, distance 208 may be between 11 and 17 cm. A power supply system such as power supply system 210 may be utilized for applying a voltage between 16 and 21 kV between nozzle tip 206 and the support layer (not illustrated) attached to collector 204. As used herein, attaching the exemplary support layer (not illustrated) or stainless steel mesh 2040 on the collector may refer to covering an outer surface of the collector with the aforementioned exemplary support layer (not illustrated) or stainless steel mesh 2040 such that, when nanofibers are being discharged from the exemplary electrospinning nozzle, the nanofibers may be collected onto either stainless steel mesh 2040 or the exemplary support layer (not illustrated) in steps 104 and 106.

In an exemplary embodiment, step 108 may include cross-linking the tragacanth nanofibrous web by exposing the tragacanth nanofibrous web to a saturated vapor of a cross-linking agent, such as glutaraldehyde. In an exemplary embodiment, exposing the tragacanth nanofibrous web to a saturated vapor of a cross-linking agent may include placing the tragacanth nanofibrous web and the cross-linking agent within a sealed enclosure such as a desiccator. The exemplary cross-linking agent may evaporate within the sealed enclosure and the saturated vapor of the cross-linking agent may come in contact with the tragacanth nanofibrous web.

Figure 3:
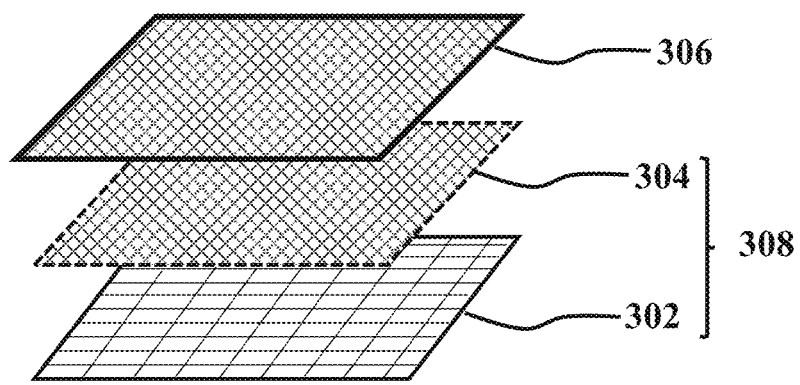
FIG. 3 illustrates a water-absorbent filter containing pure tragacanth nanofibers, consistent with one or more exemplary embodiments of the present disclosure.

FIG. 3 illustrates a water-absorbent filter 300 containing pure tragacanth nanofibers, consistent with one or more exemplary embodiments of the present disclosure. In an exemplary embodiment, water-absorbent filter 300 may include three layers, namely, a stainless steel layer 302, a hydrophobic polymeric layer 304, and a pure tragacanth nanofibrous layer 306. In an exemplary embodiment, water-absorbent filter 300 may be fabricated utilizing a method similar to method 100 of the present disclosure. In an exemplary embodiment, hydrophobic polymeric layer 304 may be electrospun onto stainless steel layer 302 to form a support layer 308. Then, pure tragacanth nanofibrous layer 306 may be electrospun on support layer 308 to form water-absorbent filter 300. In an exemplary embodiment, hydrophobic polymeric layer 304 may be fabricated by electrospinning a hydrophobic polymer, such as PAN onto stainless steel layer 302. In an exemplary embodiment, pure tragacanth nanofibrous layer 306 may include pure tragacanth nanofibers with an average diameter between 129 nm and 160 nm.

Figure 4:
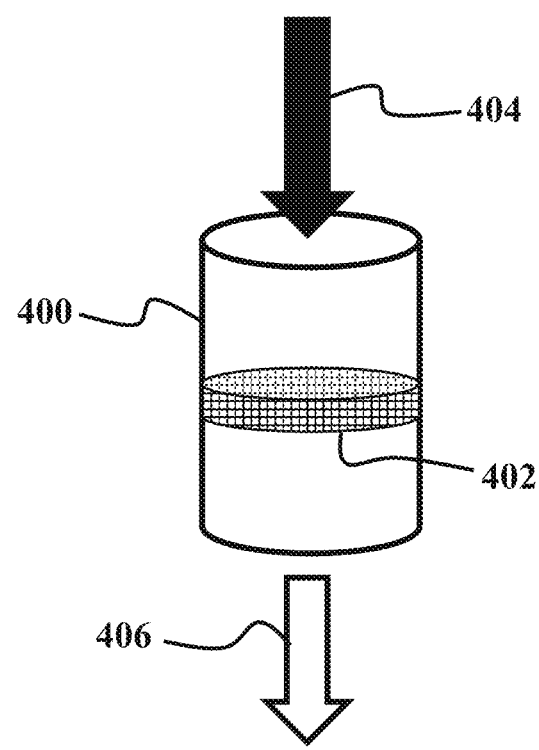
FIG. 4 illustrates a filtration module for separating water from a feed, consistent with one or more exemplary embodiments of the present disclosure.

In an exemplary embodiment, an exemplary water-absorbent filter such as water-absorbent filter 300, which may be fabricated by method 100 may be utilized for separating water from a feed. For example, FIG. 4 illustrates a filtration module 400 for separating water from a feed 404, consistent with one or more exemplary embodiments of the present disclosure. In an exemplary embodiment, filtration module 400 may include a water-absorbent filter 402 that may be structurally similar to water-absorbent filter 300. Water-absorbent filter 402 may be disposed within filtration module 400 in a fluid-tight manner, i.e., no fluid may pass around water-absorbent filter 402 and feed 404 may pass through water-absorbent filter 402. In an exemplary embodiment, feed 404 that may be a feed with an unwanted water content such as a hydrocarbon or fuel feed may be forced to pass through water-absorbent filter 402. In exemplary embodiments, forcing feed 404 may include either applying a positive pressure to feed 404 or drawing feed 404 through water-absorbent filter 402 by applying negative pressure at a discharge stream 406 of filtration module 400. Either way, feed 404 may pass through water-absorbent filter 402 and the water content of feed 404 may decrease due to water content of feed 404 being absorbed by the exemplary pure tragacanth nanofibrous layer of water-absorbent filter 402.

Figure 5:
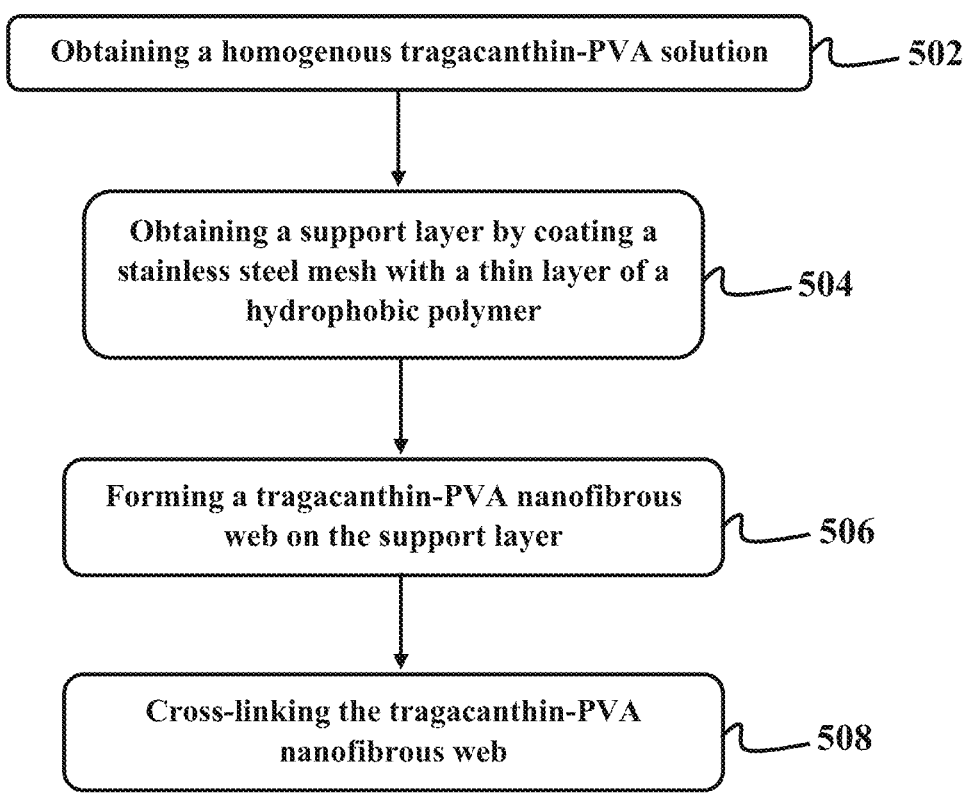
FIG. 5 illustrates a method for fabricating a filter containing tragacanthin-polyvinyl alcohol (PVA) nanofibers, consistent with one or more exemplary embodiments of the present disclosure.

FIG. 5 illustrates a method 500 for fabricating a filter containing tragacanthin-polyvinyl alcohol (PVA) nanofibers, consistent with one or more exemplary embodiments of the present disclosure. In an exemplary embodiment, method 500 may include a step 502 of obtaining a homogenous tragacanthin-PVA solution, a step 504 of obtaining a support layer by coating a stainless steel mesh with a thin layer of a hydrophobic polymer, a step 506 of forming a tragacanthin-PVA nanofibrous web on the support layer by electrospinning the homogenous tragacanthin-PVA solution onto the support layer, and a step 508 of cross-linking the tragacanthin-PVA nanofibrous web by exposing the tragacanthin-PVA nanofibrous web to a saturated vapor of a cross-linking agent.

In an exemplary embodiment, step 502 of obtaining a homogenous tragacanthin-PVA solution may include obtaining a PVA solution by dissolving PVA in distilled water and adding tragacanthin to the PVA solution. In an exemplary embodiment, dissolving PVA in distilled water may include mixing PVA with distilled water and then stirring the obtained PVA solution at a temperature of approximately 80° C. for approximately 2 hours. After that, tragacanthin may be added to the obtained PVA solution and may be stirred for 12 to 24 hours at room temperature to obtain a homogenous tragacanthin-PVA solution. In an exemplary embodiment, obtaining a PVA solution may include dissolving a predetermined amount of PVA in distilled water, such that after adding tragacanthin to the PVA solution, the mass ratio of tragacanthin to PVA may be between 40 to 60 (mass of tragacanthin to PVA) and 90 to 10.

In an exemplary embodiment, step 502 of obtaining a homogenous tragacanthin-PVA solution for mass ratios of tragacanthin to PVA of equal to or more than 70 to 30 (mass of tragacanthin to PVA) may further include adding formic acid to the tragacanthin-PVA solution. In other words, for preparing homogenous tragacanthin-PVA solutions with mass ratios of tragacanthin to PVA of equal to or more than 70 to 30 (mass of tragacanthin to PVA), first PVA may be dissolved in distilled water, then tragacanthin powder may be added to the PVA solution, and after that formic acid may be added and the obtained solution may be stirred for 12 to 24 hours at room temperature to obtain a homogenous tragacanthin-PVA solution.

In an exemplary embodiment, step 504 of obtaining a support layer by coating a stainless steel mesh with a thin layer of a hydrophobic polymer may include electrospinning a hydrophobic polymer solution onto the stainless steel mesh. In an exemplary embodiment, electrospinning a hydrophobic polymer solution onto the stainless steel mesh may include electrospinning a polyacrylonitrile (PAN) solution onto the stainless steel mesh. In an exemplary embodiment, PAN solution may have a mass concertation of 16 w/v %. In an exemplary embodiment, electrospinning the PAN solution onto the stainless steel mesh may include electrospinning the PAN solution from an electrospinning nozzle with a flow rate between 0.025 $cm^3$ $hr^{-1}$ and 0.25 $cm^3$ $hr^{-1}$ onto the stainless steel mesh, the stainless steel mesh positioned at a distance between 5 cm and 15 cm from a tip of the electrospinning nozzle, a voltage between 10 kV and 15 kV applied between the electrospinning nozzle and the stainless steel mesh. In an exemplary embodiment, PAN solution may include a solution of PAN in dimethylformamide (DMF). In an exemplary embodiment, PAN solution may be prepared by adding PAN to DMF and then stirring the obtained mixture at a temperature of approximately 40° C. for a period of, for example, 24 hours.

In an exemplary embodiment, step 506 may include forming a tragacanthin-PVA nanofibrous web on the support layer. In an exemplary embodiment, an electrospinning apparatus similar to electrospinning apparatus 200 may be utilized for electrospinning the homogenous tragacanthin-PVA solution onto the support layer. Forming a tragacanthin-PVA nanofibrous web on the support layer may include electrospinning the homogenous tragacanthin-PVA solution onto the support layer from an electrospinning nozzle such as nozzle 202 with a flow rate between 0.025 and 0.125 $cm^3$ $hr^{-1}$ onto the support layer. The support layer may be positioned on collector 204 at distance 208 between 7 and 17 cm. A power supply system similar to power supply system 210 may apply a voltage between 10 and 20 kV between nozzle tip 206 and the support layer attached to collector 204. As used herein, attaching the exemplary support layer on collector 204 may refer to covering a portion or an entire outer surface of collector 204 with the exemplary support layer, such that electrospun nanofibers may be collected on a surface of the exemplary support layer.

In an exemplary embodiment, step 508 may include cross-linking the tragacanthin-PVA nanofibrous web by exposing the tragacanthin-PVA nanofibrous web to a saturated vapor of a cross-linking agent, such as glutaraldehyde. In an exemplary embodiment, exposing the tragacanthin-PVA nanofibrous web to a saturated vapor of a cross-linking agent may include placing the tragacanthin-PVA nanofibrous web and the cross-linking agent within a sealed enclosure such as a desiccator. The exemplary cross-linking agent evaporates within the sealed enclosure and the saturated vapor of the cross-linking agent may come in contact with the tragacanthin-PVA nanofibrous web.

Figure 6:
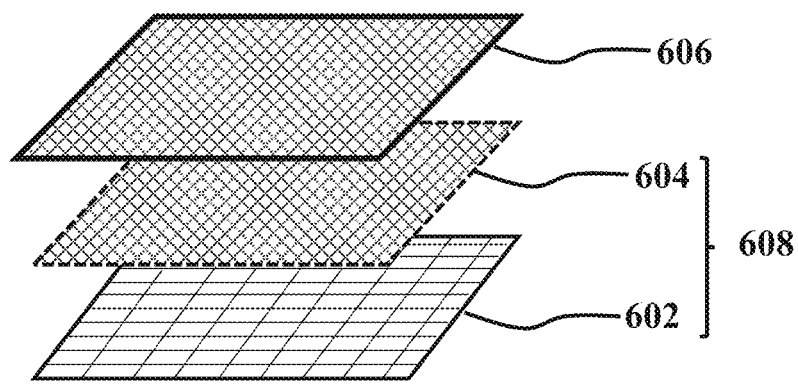
FIG. 6 illustrates a water-absorbent filter containing tragacanthin-PVA nanofibers, consistent with one or more exemplary embodiments of the present disclosure.

FIG. 6 illustrates a water-absorbent filter 600 containing tragacanthin-PVA nanofibers, consistent with one or more exemplary embodiments of the present disclosure. In an exemplary embodiment, water-absorbent filter 600 may include three layers, namely, a stainless steel layer 602, a hydrophobic polymeric layer 604, and a tragacanthin-PVA nanofibrous layer 606. In an exemplary embodiment, water-absorbent filter 600 may be fabricated utilizing a method similar to method 500 of the present disclosure. In an exemplary embodiment, hydrophobic polymeric layer 604 may be electrospun onto stainless steel layer 602 to form a support layer 608. Then, tragacanthin-PVA nanofibrous layer 606 may be electrospun on support layer 608 to form water-absorbent filter 600. In an exemplary embodiment, hydrophobic polymeric layer 604 may be fabricated by electrospinning a hydrophobic polymer, such as PAN onto stainless steel layer 602. In an exemplary embodiment, tragacanthin-PVA nanofibrous layer 606 may include tragacanthin-PVA nanofibers with an average diameter between 80 nm and 382 nm.

In an exemplary embodiment, an exemplary water-absorbent filter such as water-absorbent filter 600, which may be fabricated by method 500 may be utilized for separating water from a feed. For example, referring to FIG. 4, in an exemplary embodiment, water-absorbent filter 402 may be similar to water-absorbent filter 600. Water-absorbent filter 402 may be disposed within filtration module 400 in a fluid-tight manner, i.e., no fluid may pass around water-absorbent filter 402 and feed 404 may pass through water-absorbent filter 402. In an exemplary embodiment, feed 404 that may be a feed with an unwanted water content such as a hydrocarbon or fuel feed may be forced to pass through water-absorbent filter 402. In an exemplary embodiment, forcing feed 404 may include either applying a positive pressure to feed 404 or drawing feed 404 through water-absorbent filter 402 by applying negative pressure at a discharge stream 406 of filtration module 400. Either way, feed 404 may pass through water-absorbent filter 402 and the water content of feed 404 may decrease due to water content of feed 404 being absorbed by the exemplary tragacanthin-PVA nanofibrous layer of water-absorbent filter 402.

EXAMPLE 1

In this example, exemplary filters containing exemplary pure tragacanth nanofibrous webs were fabricated utilizing method 100. A tragacanth suspension in a four-part solvent system was prepared with a mass concentration of 1.5% based on the total volume of the tragacanth suspension. The exemplary solvent system included distilled water, ethyl acetate, acetic acid, and formic acid. To prepare the exemplary tragacanth suspension, 0.181 g of pure tragacanth was added to 6.36 cm$^3$ of distilled water in a homogenizer. Here, a magnetic stirrer was utilized to homogenize the exemplary suspension of pure tragacanth in distilled water by stirring the exemplary suspension. After that 0.97 cm$^3$ of formic acid was added to the exemplary suspension followed by stirring the suspension. Then 2.62 cm$^3$ of acetic acid was added to the exemplary suspension followed by stirring the suspension, and finally, 2.13 cm$^3$ of ethyl acetate was added to the exemplary suspension. To reach the complete dissolution of pure tragacanth in the exemplary four-part solvent system, the final exemplary tragacanth suspension was homogenized by stirring the final exemplary tragacanth suspension at ambient temperature for a duration of approximately 3 to 5 days.

A support layer was prepared by coating a stainless steel mesh with a layer of polyacrylonitrile (PAN). In this example, a layer of PAN was electrospun on a stainless steel mesh with a mesh size of mesh 400. To this end, a solution of PAN in dimethylformamide (DMF) was prepared with a mass concentration of 16% per total volume of the exemplary solution of PAN in DMF. 16 g of PAN was added to 100 cm$^3$ of DMF and then stirred at a temperature of approximately 40° C. for 24 hours. An electrospinning apparatus similar to apparatus 200 was utilized to coat the exemplary stainless steel mesh with the exemplary PAN solution. In this example, the exemplary PAN solution was electrospun onto the exemplary stainless steel mesh at a flow rate of 0.25 cm$^3$ hr$^{-1}$, distance 208 of 15 cm, and a voltage of 15 kV for approximately 40 minutes at a collector rotational speed of 100 rpm. To this end, circular pieces cut out of the exemplary stainless steel mesh were attached on collector 204 of apparatus 200 and then apparatus 200 was utilized to coat the exemplary circular pieces of the exemplary stainless steel mesh with the exemplary PAN solution.

In this example, two samples of pure tragacanth nanofibrous webs were fabricated. A first sample, which is referred to herein as sample A, was prepared by electrospinning the exemplary tragacanth suspension onto the exemplary support layer utilizing an electrospinning apparatus similar to apparatus 200, at a flow rate of 0.025 cm$^3$ hr$^{-1}$, distance 208 of 12 cm, and a voltage of 16 kV. A second sample, which is referred to herein as sample B, was prepared by electrospinning the exemplary tragacanth suspension on to the exemplary support layer utilizing an electrospinning apparatus similar to apparatus 200, at a flow rate of 0.025 cm$^3$ hr$^{-1}$, distance 208 of 17 cm, and a voltage of 19 kV. Table 1 summarizes the electrospinning conditions for the exemplary pure tragacanth suspension.

TABLE 1

Electrospinning conditions for tragacanth solution

| Solution | Electrospinning parameters | | |
|---|---|---|---|
| | Flow rate (cm$^3$/h$^{-1}$) | Distance (cm) | Voltage (kV) |
| Sample A | 0.025 | 12 | 16 |
| Sample B | 0.025 | 17 | 19 |

These two samples of pure tragacanth nanofibrous webs, namely, sample A and Sample B were prepared under different electrospinning conditions, as set forth in Table 1 above, in order to investigate the morphology of the electrospun pure tragacanth nanofibers.

Figure 7A:
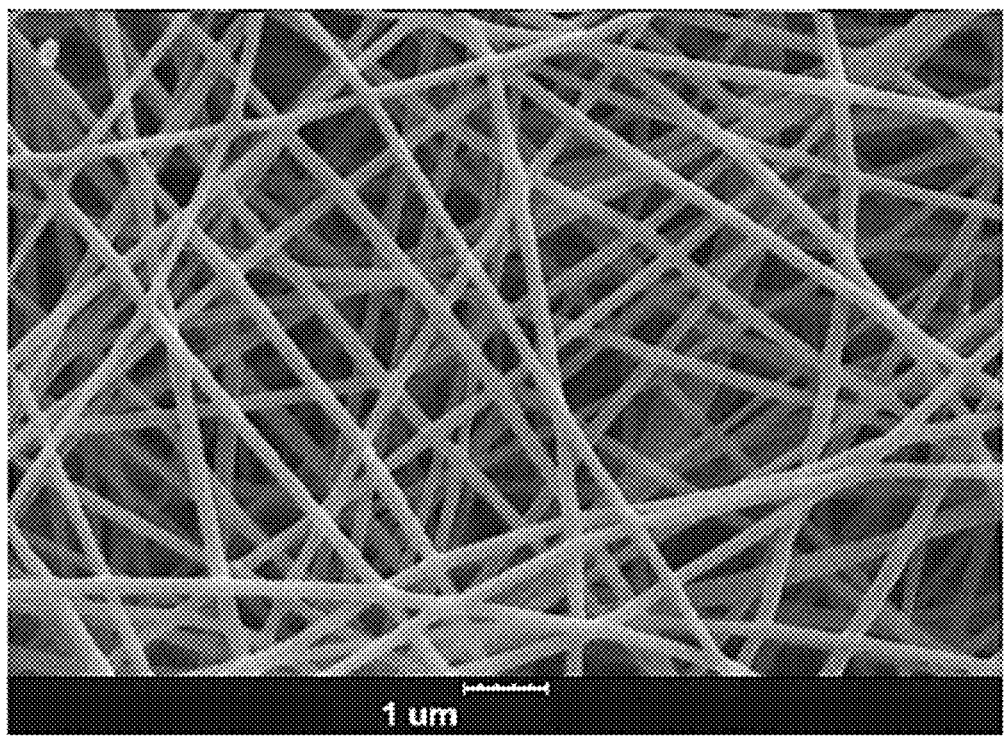
FIG. 7A illustrates a scanning electron microscope (SEM) image of sample A of pure tragacanth nanofibrous web, consistent with one or more exemplary embodiments of the present disclosure.
Figure 7B:
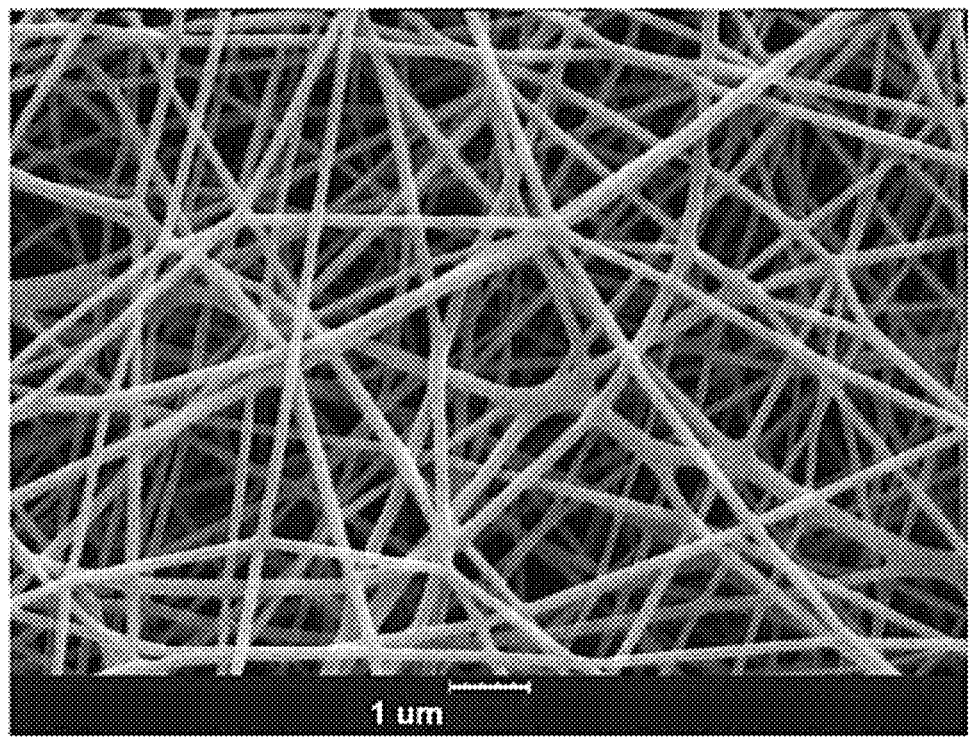
FIG. 7B illustrates an SEM image of sample B of pure tragacanth nanofibrous web, consistent with one or more exemplary embodiments of the present disclosure.

FIG. 7A illustrates a scanning electron microscope (SEM) image of sample A of pure tragacanth nanofibrous web, consistent with one or more exemplary embodiments of the present disclosure. FIG. 7B illustrates a scanning electron microscope (SEM) image of sample B of pure tragacanth nanofibrous web, consistent with one or more exemplary embodiments of the present disclosure. Referring to FIGS. 7A-B, an average diameter of nanofibers along with the minimum diameter and a maximum diameter of the obtained nanofibers may be determined for each of samples A and B. For example, referring to FIG. 7A, an average diameter of pure tragacanth nanofibers in sample A was 160.5 nm. Pure tragacanth nanofibers in sample A had a maximum diameter of 227 nm and a minimum diameter of 59 nm. Referring to FIG. 7B, an average diameter of pure tragacanth nanofibers in sample B was 129.3 nm. Pure tragacanth nanofibers in sample B had a maximum diameter of 192 nm and a minimum diameter of 74 nm.

To increase the stability of the exemplary pure tragacanth nanofibrous webs, the electrospun pure tragacanth nanofibrous webs were cross-linked utilizing glutaraldehyde. To this end, pure tragacanth nanofibrous webs were exposed to 0.2 cm$^3$ saturated vapor of glutaraldehyde in a desiccator for 2-3 days. To this end, the synthesized nanofibrous webs were placed within a desiccator and were exposed to 0.2 cm$^3$ of a glutaraldehyde solution. The glutaraldehyde was poured into a petri dish and placed in the middle of the desiccator. After obtaining the cross-linked pure tragacanth nanofibrous webs, the remaining glutaraldehyde was allowed to evaporate by keeping the prepared samples under a lab hood for 24 hours.

Figure 8:
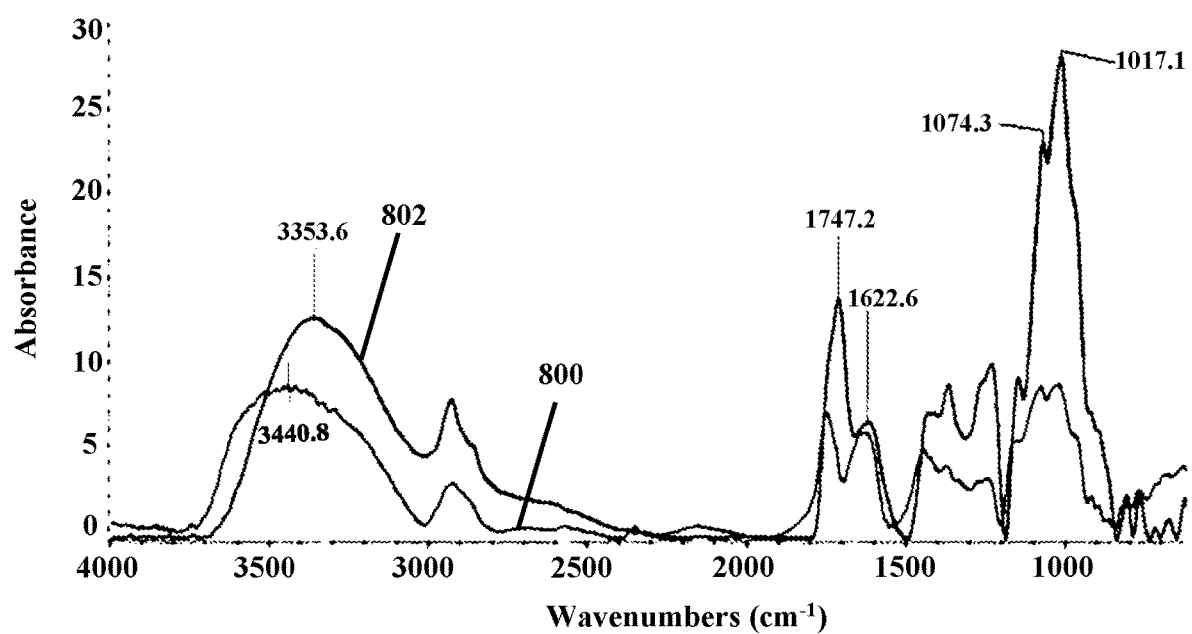
FIG. 8 illustrates a Fourier-transform infrared spectroscopy (FT-IR) spectrum of pure tragacanth and an FT-IR spectrum of pure tragacanth nanofibers, consistent with one or more exemplary embodiments of the present disclosure.

FIG. 8 illustrates Fourier-transform infrared spectroscopy (FT-IR) spectrum 800 of pure tragacanth and FT-IR spectrum 802 of pure tragacanth nanofibers, consistent with one or more exemplary embodiments of the present disclosure. Referring to FIG. 8, by comparing FT-IR spectrum 800 of pure tragacanth and FT-IR spectrum 802 of pure tragacanth nanofibers in the range of 600 to 4000 $cm^{-1}$, it is evident that when pure tragacanth is converted to pure tragacanth nanofibers, significant changes may occur in 1017-1747 $cm^{-1}$ region. This change may be due to the tragacanth dissolution process at pH=2 that may, in turn, cause acid hydrolysis of tragacanth chains. Consequently, the tragacanth chains may break down and the number of aldehyde and hydroxyl free end groups of the tragacanth chains may increase. Due to this increase in the number of aldehyde and hydroxyl free end groups of the tragacanth chains, the aldehyde peak within FT-IR spectrum 802 increases at 1747 $cm^{-1}$ region and the same happens for C—OH ether peak at 1071 $cm^{-1}$, this is why water absorption by pure tragacanth nanofibers increases. An increase in the peak at 3353 $cm^{-1}$ for the OH group is also evident. With this increase of the OH end groups and aldehyde end groups, as well as the increase of surface to volume ratio of nanofibers relative to pure tragacanth powder, it is evident that water absorption of pure tragacanth nanofibers is more than that of pure tragacanth powder due to more accessibility of the OH groups of the pure tragacanth nanofibers. The peak in 3000-3700 $cm^{-1}$ region of the OH group is sharper for the pure tragacanth nanofibers and has shifted to the right, which may indicate an increase in intramolecular hydroxyl groups. The more water nanofibers absorb, the wider the peak in the 3000-3700 $cm^{-1}$ region. This is due to the hydrogen bonds between water and tragacanth. To accurately investigate the OH groups, the sample must be dried to eliminate the hydrogen bond with water.

Figure 9:
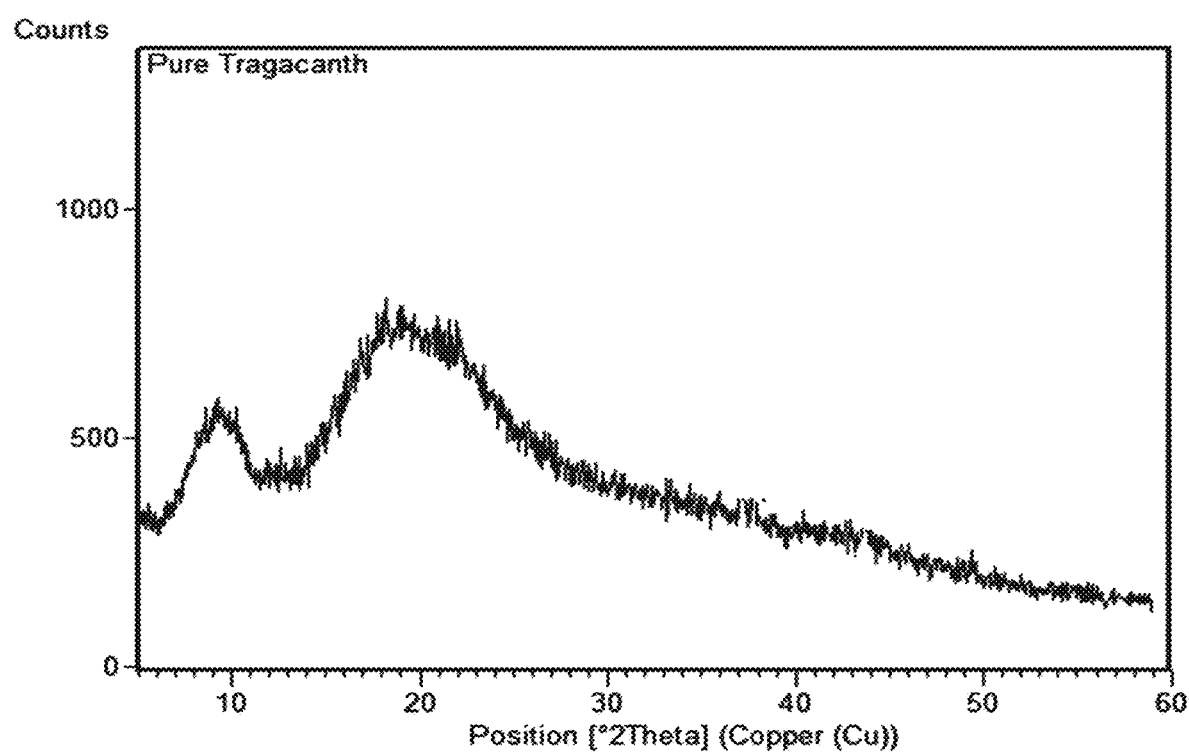
FIG. 9 illustrates an X-ray diffraction pattern of pure tragacanth nanofibrous webs, consistent with one or more exemplary embodiments of the present disclosure.

FIG. 9 illustrates an X-ray diffraction pattern of pure tragacanth nanofibrous webs, consistent with one or more exemplary embodiments of the present disclosure. As evident from FIG. 9, an X-ray diffraction pattern of pure tragacanth nanofibrous webs do not show a sharp peak, and only two broad peaks are visible in a range of 2θ=10, 20°. This may indicate the existence of small crystallites in the structure of pure tragacanth nanofibrous webs. A percentage of crystallinity of approximately 17% may be determined for pure tragacanth nanofibrous webs. A factor affecting the hydrophilic properties of the synthesized filter is the crystallinity of the layer of the tragacanth nanofibrous layer. A high crystallinity leads to a decrease in hydrophilic properties of the synthesized filter. A low crystallinity of 17% shows a higher hydrophilic tendency of pure tragacanth. However, other factors may also affect the hydrophilic properties of the synthesized filter.

EXAMPLE 2

In this example, pure tragacanth nanofibrous webs of example 1 were utilized in a filtration cell, as water-absorbent filters, to separate water from an exemplary sample of petroleum. Here, sample B of pure tragacanth nanofibrous webs with an average diameter of 129.3 nm which was electrospun on a PAN-coated stainless steel mesh, was cut into a disk-shaped filter with a diameter of approximately 5 cm.

Figure 10:
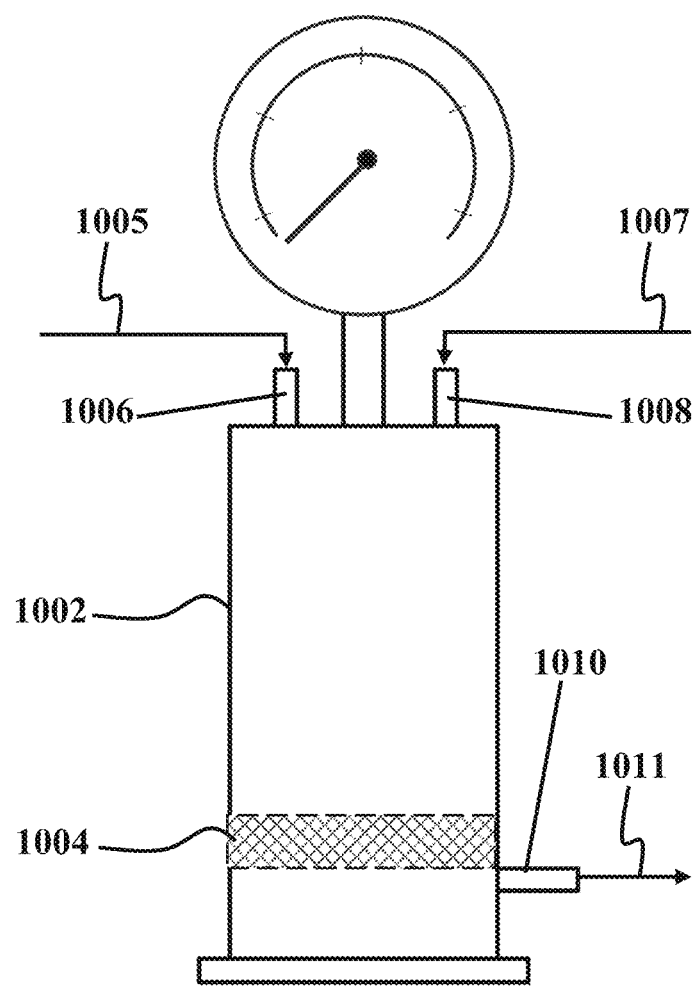
FIG. 10 illustrates a filtration device for separating water from a petroleum sample, consistent with one or more exemplary embodiments of the present disclosure.

FIG. 10 illustrates a filtration device 1000 for separating water from a petroleum sample, consistent with one or more exemplary embodiments of the present disclosure. In an exemplary embodiment, filtration device 1000 may include a filtration module 1002 that may be structurally similar to filtration module 400. In this example, filtration module 1002 housed a water-absorbent filter 1004 that included sample B of pure tragacanth nanofibrous webs with an average diameter of 129.3 nm which was electrospun on a PAN-coated stainless steel mesh, was cut into a disk-shaped filter with a diameter of approximately 5 cm. Here, filtration module 1002 included two inlet ports 1006 and 1008. An exemplary petroleum feed 1005 may be injected into filtration module 1002 via inlet port 1006. A neutral gas stream 1007 may be utilized for increasing the pressure within filtration module 1002 to help force an exemplary high-viscosity petroleum feed through water-absorbent filter 1004. Exemplary neutral gas stream 1007 may be injected into filtration module 1002 via inlet port 1008. After passing through water-absorbent filter 1004, a portion of the water content of exemplary petroleum feed 1005 may be separated and a filtrate stream 1011 that includes a lower water content may be discharged from filtration module 1002 via an outlet port 1010. Filtrate stream 1011 was then analyzed for measuring the remaining water content of the discharged petroleum sample.

Two types of petroleum samples were utilized in this example, namely a JP4 fuel and a diesel fuel. The water-content of both fuels before and after filtration was determined according to the ASTM D-6304 standard. The amounts of water content in JP4 and diesel fuels before filtration were 130 ppm and 178.25 ppm, respectively. After being filtered utilizing the exemplary thin disk-shaped filter made of pure tragacanth electrospun on a PAN-coated stainless steel mesh, the water content of filtered JP4 and filtered diesel fuels were 14.29 ppm and 29.34 ppm, respectively. In other words, the amount of water absorbed by the exemplary thin disk-shaped filter from the JP4 fuel sample was 115.71 ppm and the amount of water absorbed by the exemplary thin disk-shaped filter from diesel fuel sample was 148.91 ppm. In this example, therefore, the exemplary thin disk-shaped filter made of pure tragacanth electrospun on a PAN-coated stainless steel mesh provided a filtration efficiency of 83.54% for separating water from the exemplary diesel fuel sample and filtration efficiency of 89.10% for separating water from the exemplary JP4 fuel sample. Furthermore, volumetric flow rates of filtrate stream 1011 were also measured for each petroleum sample. The volumetric flow rate of filtrate stream 1011 was approximately 0.36 $cm^3$ $s^{-1}$ for the JP4 sample and was approximately 0.14 $cm^3$ $s^{-1}$ for the diesel sample.

EXAMPLE 3

In this example, exemplary filters containing tragacanthin-PVA nanofibrous webs were fabricated utilizing exemplary method 500. Six homogeneous tragacanthin-PVA solutions with different mass ratios of 40:60, 50:50, 60:40, 70:30, 80:20, and 90:10 (tragacanthin:PVA) were prepared.

Tragacanthin was obtained from pure tragacanth by first mixing 2 g of pure tragacanth in 200 $cm^3$ of deionized water utilizing a stirrer. Mixing was carried out by stirring the mixture of tragacanth and deionized water for 24 hours. After that, the temperature of the dispersion of pure tragacanth in water was lowered to 4° C. Then, an alkali solution of tragacanth was obtained by adding 4 g of NaOH to the suspension and the obtained alkali solution was stirred for 6 hours at 4° C. After that, the alkali solution of tragacanth was neutralized utilizing HCl by titration until the pH of the solution reached to 7.5. The obtained neutralized solution was then centrifuged at 6000 rpm for 10 minutes. The obtained solution after performing the centrifugation was then dried utilizing a rotary drier at 80° C. The concentrated solution obtained from the rotary drier was then mixed with ethanol, such that a concentration of the ethanol within the solution was 70 vol. %. After adding ethanol, a white sediment forms within the solution. The white sediment, which is water-soluble tragacanthin (WST) may be washed with ethanol three times and then may be dried at room temperature. Washing with ethanol may be carried out in two steps, first washing with a 70 vol % solution of ethanol and then washing with pure ethanol.

To prepare tragacanthin-PVA solutions with (tragacanthin:PVA) mass ratios of 40:60, 50:50, and 60:40, distilled water is utilized as a solvent. In this example, a tragacanthin-PVA solution with a (tragacanthin:PVA) mass ratio of 40:60 was prepared by first dissolving 0.144 g of PVA in 3 cm$^3$ of distilled water by mixing PVA with distilled water and then stirring the PVA solution for 2 hours at 80° C. After that, 0.096 g of tragacanthin was added to the PVA solution and was stirred for 12 to 24 hours at room temperature to obtain a homogenous tragacanthin-PVA solution, which is referred to hereinafter as WST/PVA (40:60).

A tragacanthin-PVA solution with a (tragacanthin:PVA) mass ratio of 50:50 was prepared by first dissolving 0.12 g of PVA in 3 cm$^3$ of distilled water by mixing PVA with distilled water and then stirring the PVA solution for 2 hours at 80° C. After that, 0.12 g of tragacanthin was added to the PVA solution and was stirred for 12 to 24 hours at room temperature to obtain a homogenous tragacanthin-PVA solution, which is referred to hereinafter as WST/PVA (50:50).

A tragacanthin-PVA solution with a (tragacanthin:PVA) mass ratio of 60:40 was prepared by first dissolving 0.096 g of PVA in 3 cm$^3$ of distilled water by mixing PVA with distilled water and then stirring the PVA solution for 2 hours at 80° C. After that, 0.144 g of tragacanthin was added to the PVA solution and was stirred for 12 to 24 hours at room temperature to obtain a homogenous tragacanthin-PVA solution, which is referred to hereinafter as WST/PVA (60:40).

A tragacanthin-PVA solution with a (tragacanthin:PVA) mass ratio of 70:30 was prepared by first dissolving 0.072 g of PVA in 2 cm$^3$ of distilled water by mixing PVA with distilled water and then stirring the PVA solution for 2 hours at 80° C. After that, 0.168 g of tragacanthin was added to the PVA solution and was stirred for 12 to 24 hours at room temperature to obtain a homogenous tragacanthin-PVA solution, then 1 cm$^3$ of formic acid was added to the homogenous tragacanthin-PVA solution, which is referred to hereinafter as WST/PVA (70:30).

To prepare tragacanthin-PVA solutions with (tragacanthin:PVA) mass ratios of 70:30, 80:20, and 90:10, distilled water and formic acid were utilized as the solvent. For example, a tragacanthin-PVA solution with a (tragacanthin:PVA) mass ratio of 80:20 was prepared by first dissolving 0.03 g of PVA in 2 cm$^3$ of distilled water by mixing PVA with distilled water and then stirring the PVA solution for 2 hours at 80° C. After that, 0.12 g of tragacanthin was added to the PVA solution and was stirred at room temperature. After the mixture of tragacanthin and PVA solution is homogenized, 1 cm$^3$ of formic acid was then added to the solution and the solution was stirred for 12 to 24 hours at room temperature to obtain a homogenous tragacanthin-PVA solution, which is referred to hereinafter as WST/PVA (80:20).

A tragacanthin-PVA solution with a (tragacanthin:PVA) mass ratio of 90:10 was prepared by first dissolving 0.015 g of PVA in 2 cm$^3$ of distilled water by mixing PVA with distilled water and then stirring the PVA solution for 2 hours at 80° C. After that, 0.135 g of tragacanthin was added to the PVA solution and was stirred at room temperature. After the mixture of tragacanthin and PVA solution is homogenized, 1 cm$^3$ of formic acid was then added to the solution and the solution was stirred for 12 to 24 hours at room temperature to obtain a homogenous tragacanthin-PVA solution, which is referred to hereinafter as WST/PVA (90:10).

A support layer was prepared by coating a stainless steel mesh with a layer of polyacrylonitrile (PAN). In this example, a layer of PAN was electrospun on a stainless steel mesh with a mesh size of 400. To this end, a solution of PAN in dimethylformamide (DMF) was prepared with a mass concentration of 16% per total volume of the exemplary solution of PAN in DMF. 16 g of PAN was added to 100 cm$^3$ of DMF and then stirred at a temperature of approximately 40° C. for 24 hours. An electrospinning apparatus similar to apparatus 200 was utilized to coat the exemplary stainless steel mesh with the exemplary PAN solution. In this example, the exemplary PAN solution was electrospun onto the exemplary stainless steel mesh at a flow rate of 0.25 cm$^3$ hr$^{-1}$, a distance of 15 cm, and a voltage of 15 kV for approximately 40 minutes with a collector rotational speed of approximately 100 rpm. To this end, circular pieces cut out of the exemplary stainless steel mesh were attached on collector 204 of apparatus 200 and then apparatus 200 was utilized to coat the exemplary circular pieces of the exemplary stainless steel mesh with the exemplary PAN solution.

In this example, six samples of tragacanthin-PVA nanofibrous webs were prepared utilizing the exemplary six tragacanthin-PVA solutions as spinning solutions. The exemplary six tragacanthin-PVA nanofibrous webs were prepared by separately electrospinning the exemplary six tragacanthin-PVA solutions onto the exemplary support layers utilizing an electrospinning apparatus similar to apparatus 200. For example, WST/PVA (40:60) was prepared by electrospinning a tragacanthin-PVA solution at a rate of 0.05 cm$^3$ hr$^{-1}$, at a distance of 17 cm, and a voltage of 14 kV. WST/PVA (50:50) was prepared by electrospinning a tragacanthin-PVA solution at a rate of 0.025 cm$^3$ hr$^{-1}$, at a distance of 7 cm, and a voltage of 10 kV. WST/PVA (60:40) was prepared by electrospinning a tragacanthin-PVA solution at a rate of 0.025 cm$^3$ hr$^{-1}$, at a distance of 8 cm, and a voltage of 17 kV. WST/PVA (70:30) was prepared by electrospinning a tragacanthin-PVA solution at a rate of 0.025 cm$^3$ hr$^{-1}$, at a distance of 15 cm, and a voltage of 17 kV. WST/PVA (80:20) was prepared by electrospinning a tragacanthin-PVA solution at a rate of 0.025 cm$^3$ hr$^{-1}$, at a distance of 15 cm, and a voltage of 17 kV. WST/PVA (90:10) was prepared by electrospinning a tragacanthin-PVA solution at a rate of 0.075 cm$^3$ hr$^{-1}$, at a distance of 13 cm, and a voltage of 15 kV. Table 2 summarizes the electrospinning conditions for the exemplary tragacanthin-PVA solutions.

TABLE 2

Electrospinning conditions for tragacanthin-PVA solutions

| Solution | Electrospinning parameters | | |
| --- | --- | --- | --- |
| | Flow rate (cm³hr⁻¹) | Distance (cm) | Voltage (kV) |
| WST/PVA (40:60) | 0.05 | 17 | 14 |
| WST/PVA (50:50) | 0.025 | 7 | 10 |
| WST/PVA (60:40) | 0.025 | 8 | 17 |
| WST/PVA (70:30) | 0.025 | 15 | 17 |
| WST/PVA (80:20) | 0.025 | 15 | 17 |
| WST/PVA (90:10) | 0.075 | 13 | 15 |

To investigate the morphology of the electrospun tragacanthin-PVA nanofibrous webs, SEM images of the electrospun tragacanthin-PVA nanofibrous webs were obtained.

Figure 11A:
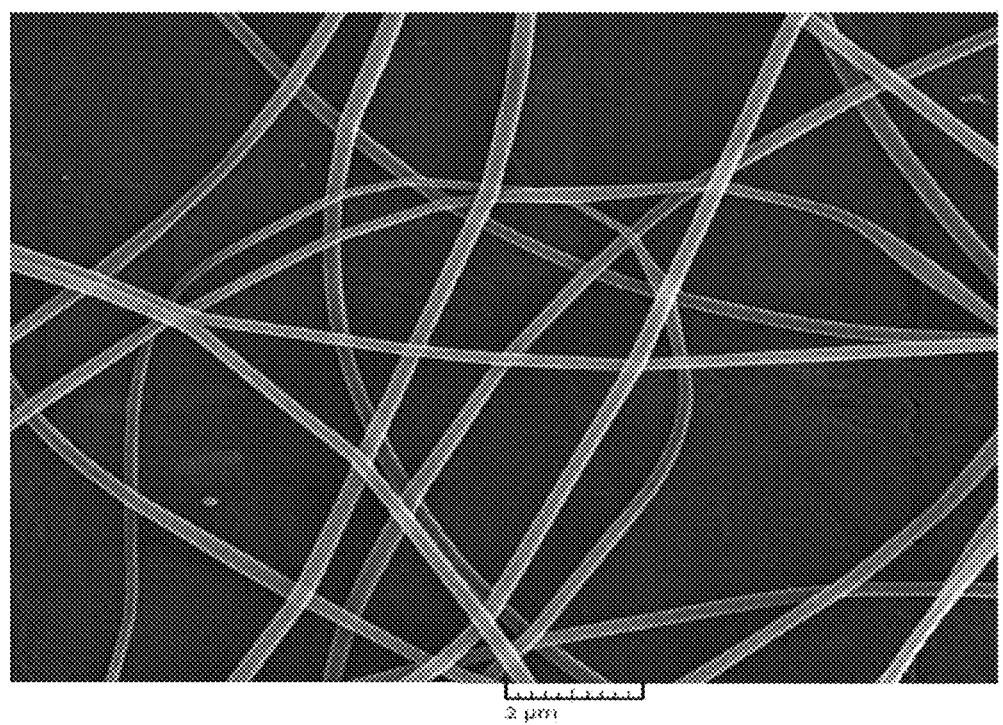
FIG. 11A illustrates an SEM image of a tragacanthin-PVA nanofibrous web WST/PVA (40:60) consistent with one or more exemplary embodiments of the present disclosure.

FIG. 11A illustrates an SEM image of tragacanthin-PVA nanofibrous web WST/PVA (40:60) consistent with one or more exemplary embodiments of the present disclosure. Referring to FIG. 11A, an average diameter of tragacanthin-PVA nanofibrous web WST/PVA (40:60) was 381.6 nm. WST/PVA (40:60) nanofibers had a maximum diameter of 567 nm and a minimum diameter of 174 nm.

Figure 11B:
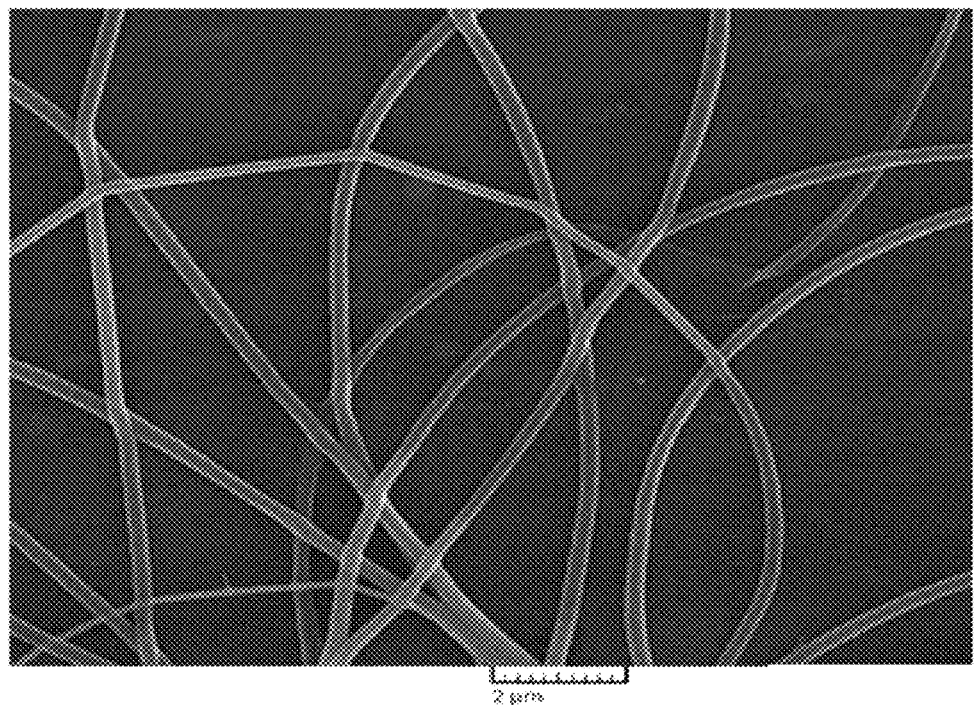
FIG. 11B illustrates an SEM image of a tragacanthin-PVA nanofibrous web WST/PVA (50:50), consistent with one or more exemplary embodiments of the present disclosure.

FIG. 11B illustrates an SEM image of tragacanthin-PVA nanofibrous web WST/PVA (50:50), consistent with one or more exemplary embodiments of the present disclosure. Referring to FIG. 11B, an average diameter of tragacanthin-PVA nanofibrous web WST/PVA (50:50) was 328.3 nm. WST/PVA (50:50) nanofibers had a maximum diameter of 515 nm and a minimum diameter of 176 nm.

Figure 11C:
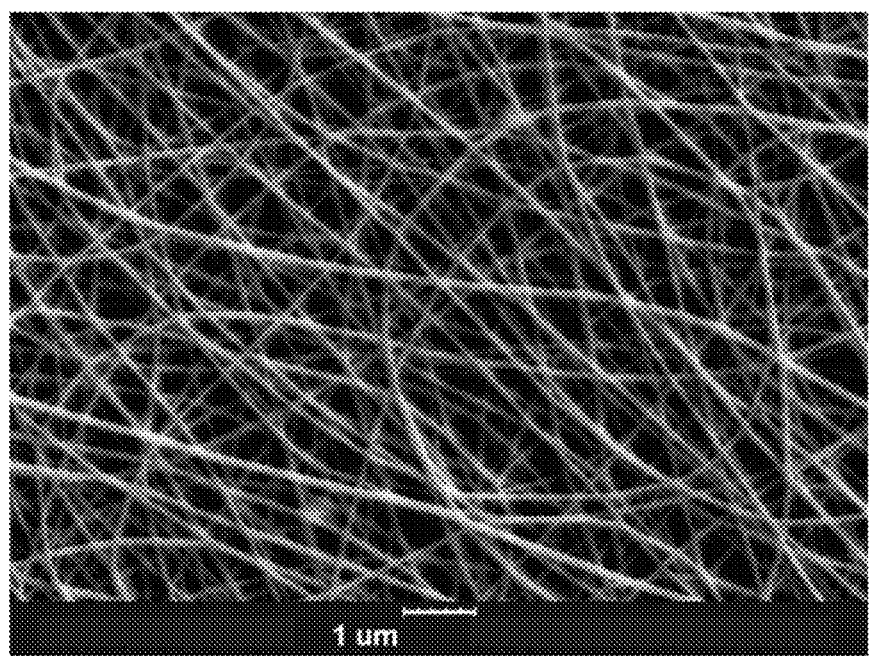
FIG. 11C illustrates an SEM image of a tragacanthin-PVA nanofibrous web WST/PVA (60:40), consistent with one or more exemplary embodiments of the present disclosure.

FIG. 11C illustrates an SEM image of tragacanthin-PVA nanofibrous web WST/PVA (60:40), consistent with one or more exemplary embodiments of the present disclosure. Referring to FIG. 11C, an average diameter of tragacanthin-PVA nanofibrous web WST/PVA (60:40) was 86.9 nm. WST/PVA (60:40) nanofibers had a maximum diameter of 119 nm and a minimum diameter of 61 nm.

Figure 11D:
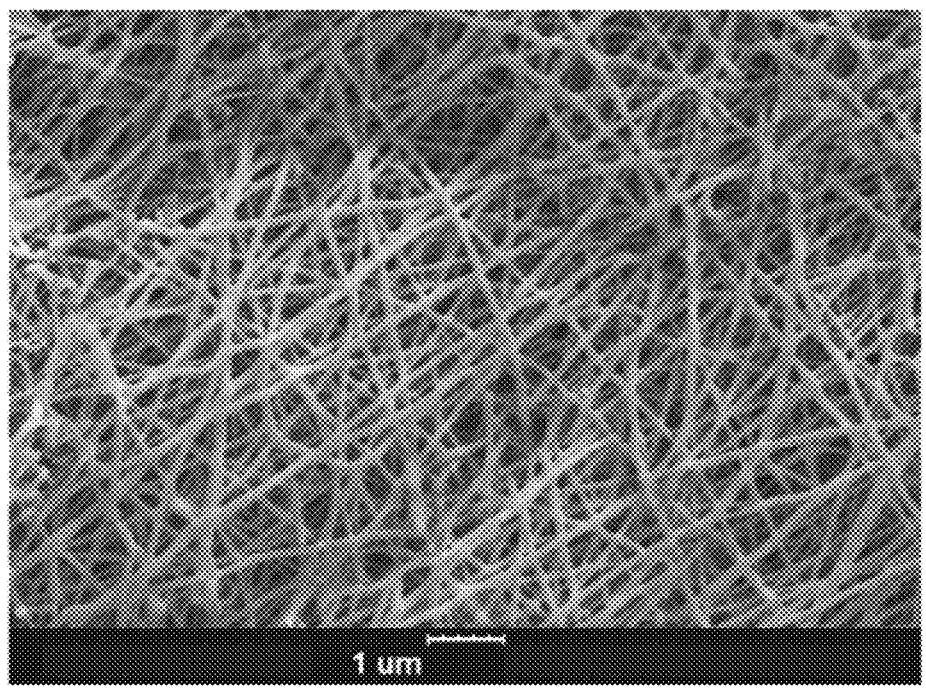
FIG. 11D illustrates an SEM image of a tragacanthin-PVA nanofibrous web WST/PVA (70:30), consistent with one or more exemplary embodiments of the present disclosure.

FIG. 11D illustrates an SEM image of tragacanthin-PVA nanofibrous web WST/PVA (70:30), consistent with one or more exemplary embodiments of the present disclosure. Referring to FIG. 11D, an average diameter of tragacanthin-PVA nanofibrous web WST/PVA (70:30) was 79.8 nm. WST/PVA (70:30) nanofibers had a maximum diameter of 125 nm and a minimum diameter of 53 nm.

Figure 11E:
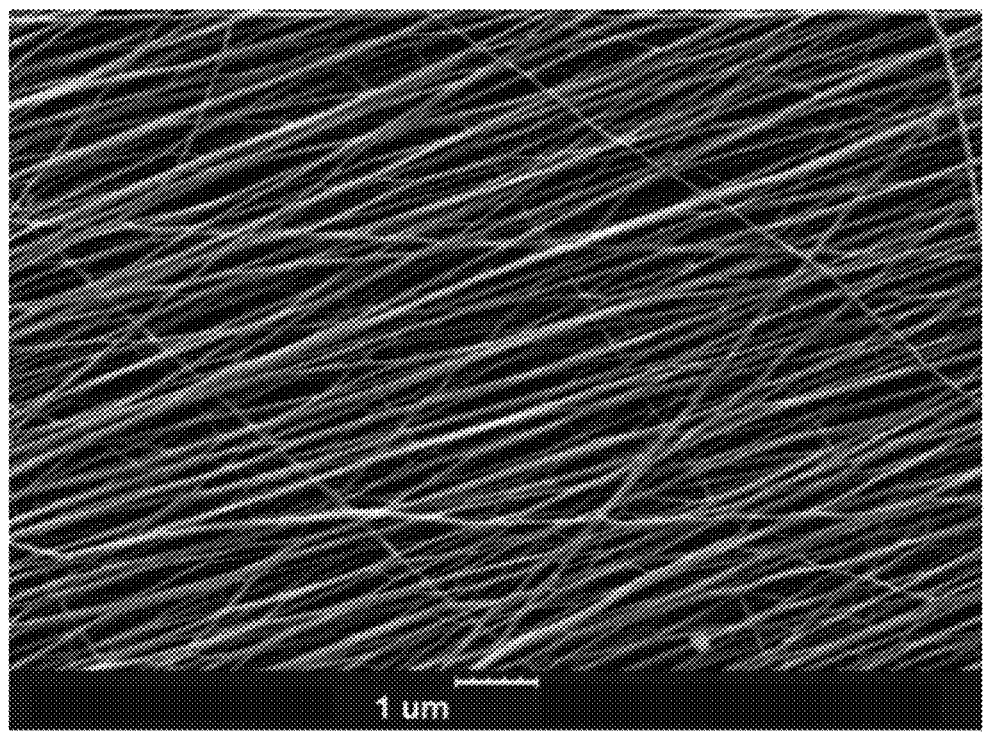
FIG. 11E illustrates an SEM image of a tragacanthin-PVA nanofibrous web WST/PVA (80:20), consistent with one or more exemplary embodiments of the present disclosure.

FIG. 11E illustrates an SEM image of tragacanthin-PVA nanofibrous web WST/PVA (80:20), consistent with one or more exemplary embodiments of the present disclosure. Referring to FIG. 11E, an average diameter of tragacanthin-PVA nanofibrous web WST/PVA (80:20) was 82.9 nm. WST/PVA (80:20) nanofibers had a maximum diameter of 104 nm and a minimum diameter of 52 nm.

Figure 11F:
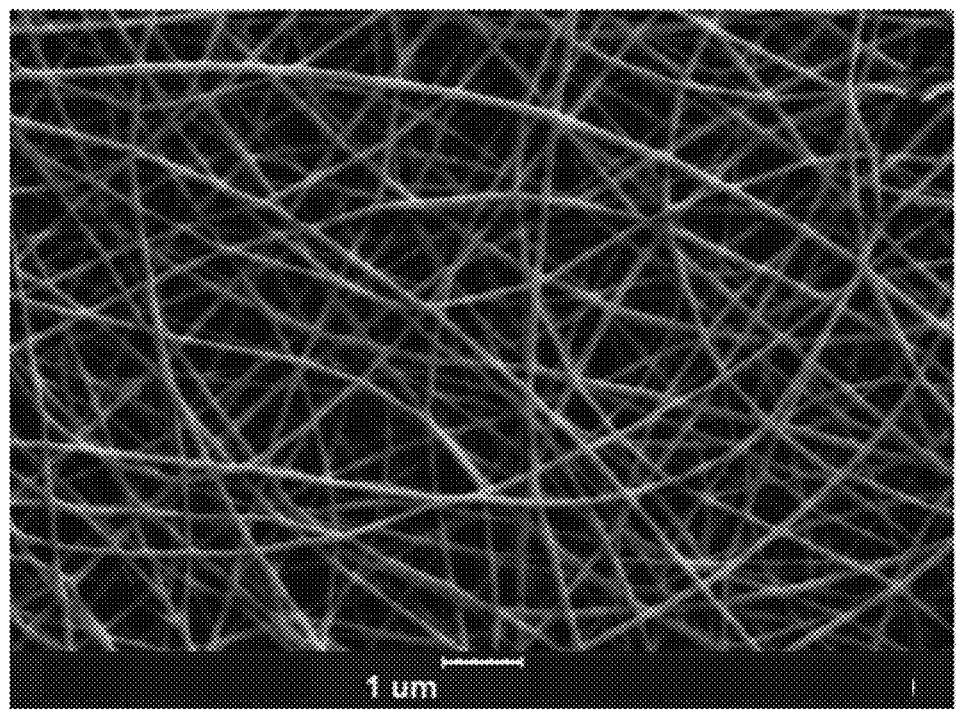
FIG. 11F illustrates an SEM image of a tragacanthin-PVA nanofibrous web WST/PVA (90:10), consistent with one or more exemplary embodiments of the present disclosure.

FIG. 11F illustrates an SEM image of tragacanthin-PVA nanofibrous web WST/PVA (90:10), consistent with one or more exemplary embodiments of the present disclosure. Referring to FIG. 11F, an average diameter of tragacanthin-PVA nanofibrous web WST/PVA (90:10) was 80.6 nm. WST/PVA (90:10) nanofibers had a maximum diameter of 118 nm and a minimum diameter of 32 nm. Table 3 summarizes the average, maximum, and minimum diameters of the electrospun WST/PVA nanofibers.

TABLE 3

Average, maximum, and minimum diameters of the electrospun WST/PVA nanofibers

| WST/PVA | Concentration (w/v) % | Average diameter (nm) | Minimum diameter (nm) | Maximum diameter (nm) |
| --- | --- | --- | --- | --- |
| 40/60 | 8 | 381.6 | 174 | 567 |
| 50/50 | 8 | 328.3 | 176 | 515 |
| 60/40 | 8 | 86.9 | 61 | 119 |
| 70/30 | 8 | 79.8 | 53 | 125 |
| 80/20 | 5 | 82.9 | 52 | 104 |
| 90/10 | 5 | 80.6 | 32 | 118 |

Figure 12A:
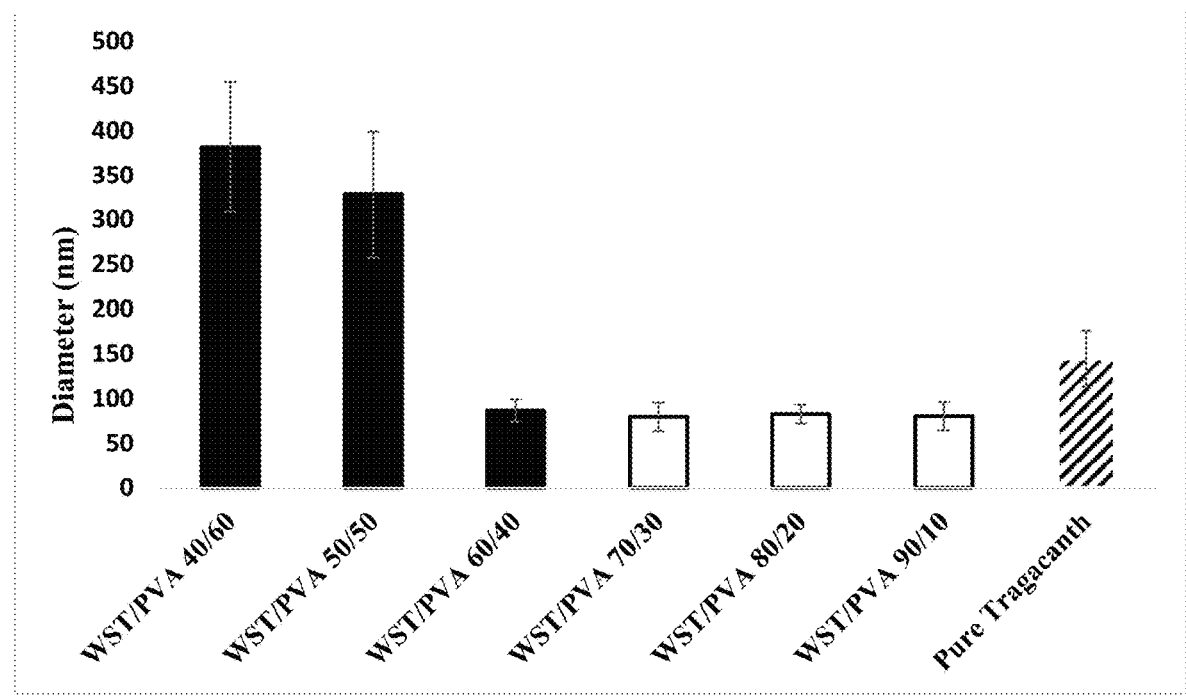
FIG. 12A shows average diameters of the electrospun tragacanthin-PVA nanofibrous webs and a pure tragacanth nanofibrous web, consistent with one or more exemplary embodiments of the present disclosure.
Figure 12B:
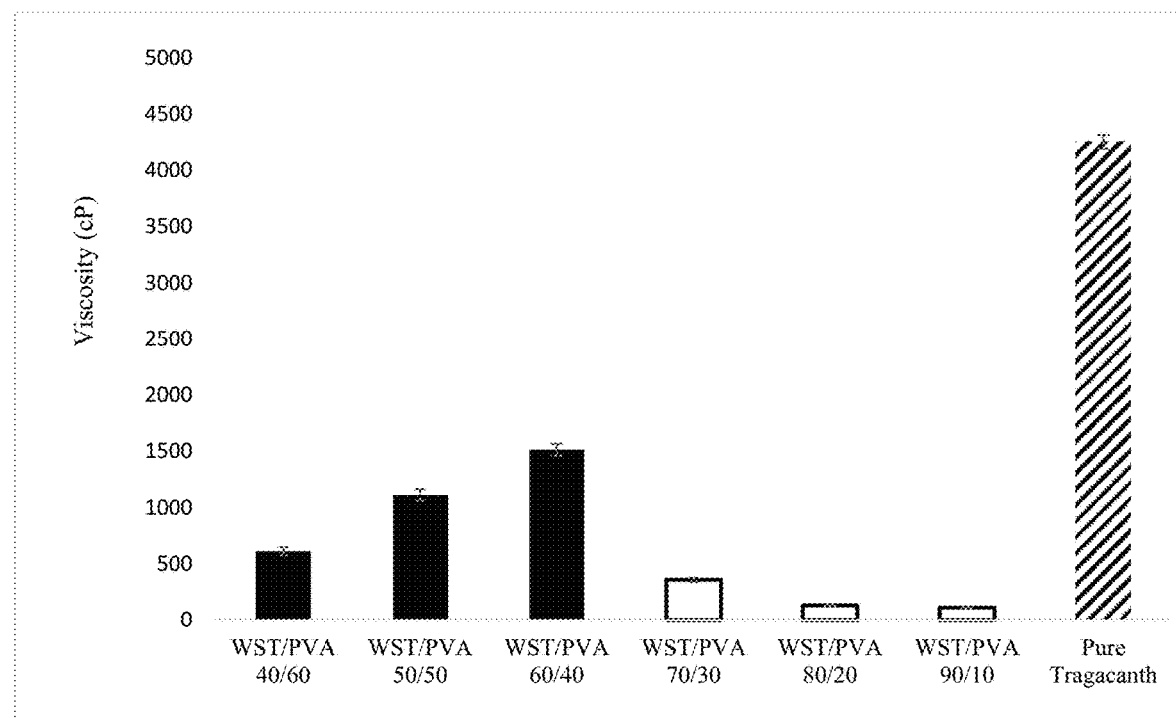
FIG. 12B shows viscosities of the electrospun tragacanthin-PVA nanofibrous webs and a pure tragacanth nanofibrous web, consistent with one or more exemplary embodiments of the present disclosure.
Figure 12C:
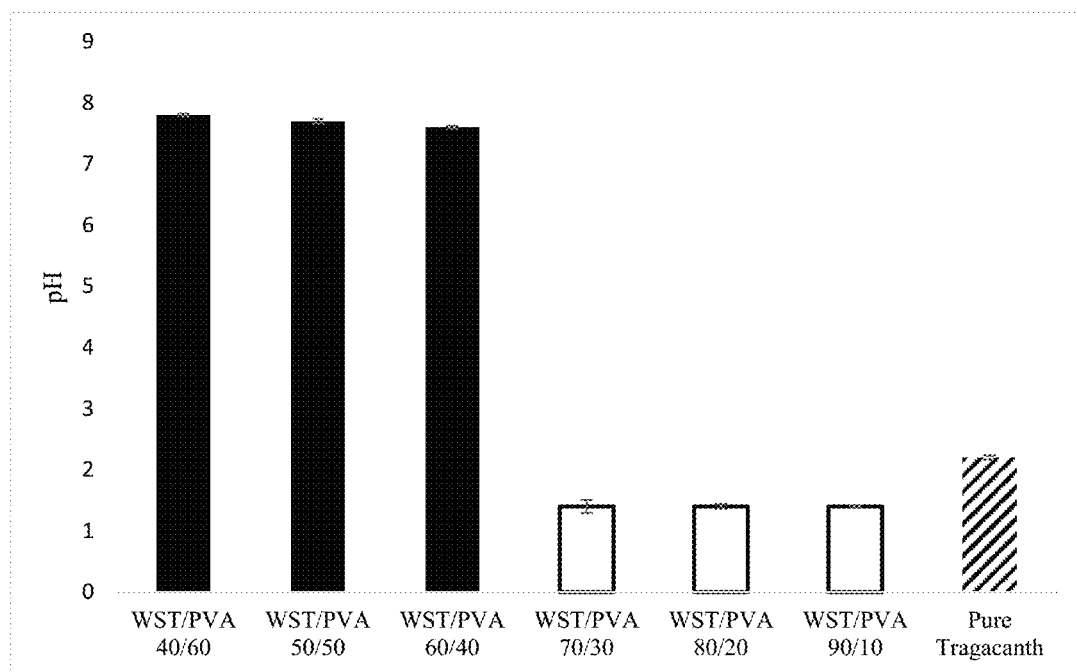
FIG. 12C shows pH's of the electrospun tragacanthin-PVA nanofibrous webs and a pure tragacanth nanofibrous web, consistent with one or more exemplary embodiments of the present disclosure.

FIG. 12A shows average diameters of the electrospun tragacanthin-PVA nanofibrous webs and a pure tragacanth nanofibrous webs, consistent with one or more exemplary embodiments of the present disclosure. FIG. 12B shows viscosities of the electrospun tragacanthin-PVA nanofibrous webs and a pure tragacanth nanofibrous webs, consistent with one or more exemplary embodiments of the present disclosure. FIG. 12C shows pH's of the electrospun tragacanthin-PVA nanofibrous webs and pure tragacanth nanofibrous webs, consistent with one or more exemplary embodiments of the present disclosure. Referring to FIGS. 12A-12C, it is evident that increasing tragacanthin concentration increases the viscosity of an exemplary tragacanthin-PVA solution. Hence, to reduce the viscosity of tragacanthin-PVA solutions with a mass ratio of tragacanthin to PVA of more than (70 to 30), formic acid was added to regulate viscosity. As used herein, regulating viscosity may refer to reducing the viscosity, which may lead to lower diameters of nanofibers. The reduction of viscosity is related to the breakage of tragacanthin macromolecules by formic acid. A solvent affects the pH of a solution. For example, the pH of solutions with a concentration of 8% (w/v) of tragacanthin-polyvinyl alcohol in only water is 7.5, whereas solutions containing formic acid show a pH as low as 1.5.

Figure 13:
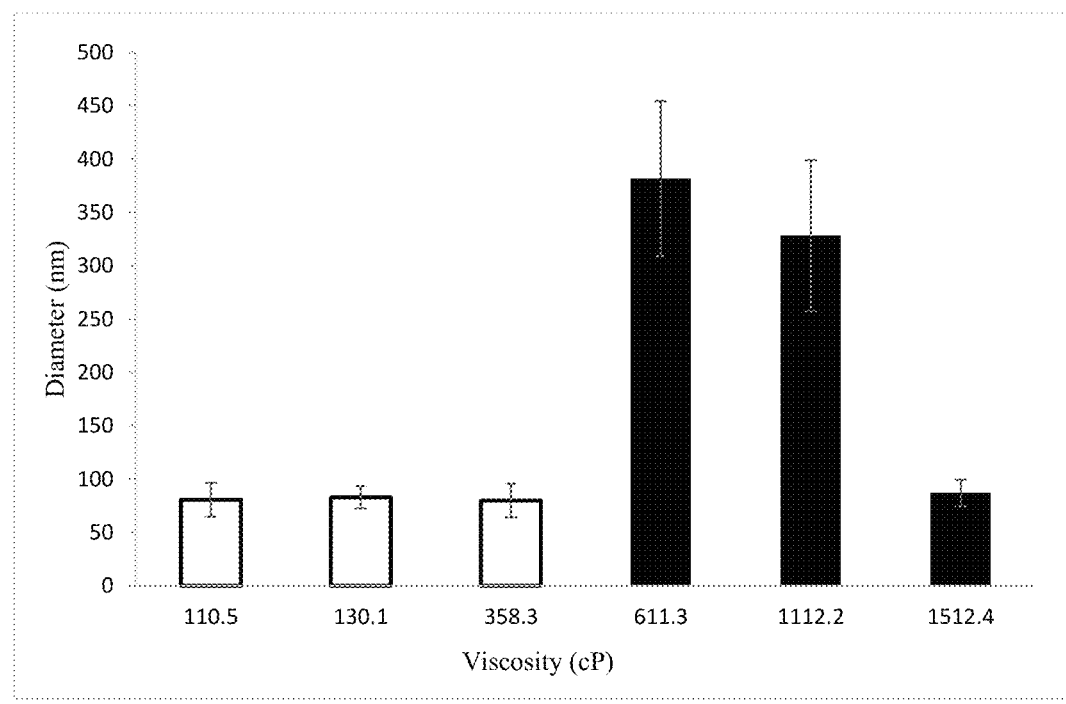
FIG. 13 illustrates a bar chart of average diameters of the electrospun tragacanthin-PVA nanofibrous webs versus viscosity of tragacanthin-PVA solutions, consistent with one or more exemplary embodiments of the present disclosure.

FIG. 13 illustrates a bar chart of average diameters of the electrospun tragacanthin-PVA nanofibrous webs versus viscosity of tragacanthin-PVA solutions, consistent with one or more exemplary embodiments of the present disclosure. It was expected that by raising viscosity, the average diameters of the electrospun tragacanthin-PVA nanofibers may increase. Referring to FIG. 13, it is evident that the viscosity of an exemplary tragacanthin-PVA solution does not significantly affect the average diameter of the electrospun tragacanthin-PVA nanofibers. This may be due to the effect of pH as well as other parameters, such as solubility, viscosity, solvent type, surface tension, electrical conductivity, process conditions (electrical parameters) and environmental factors.

Figure 14:
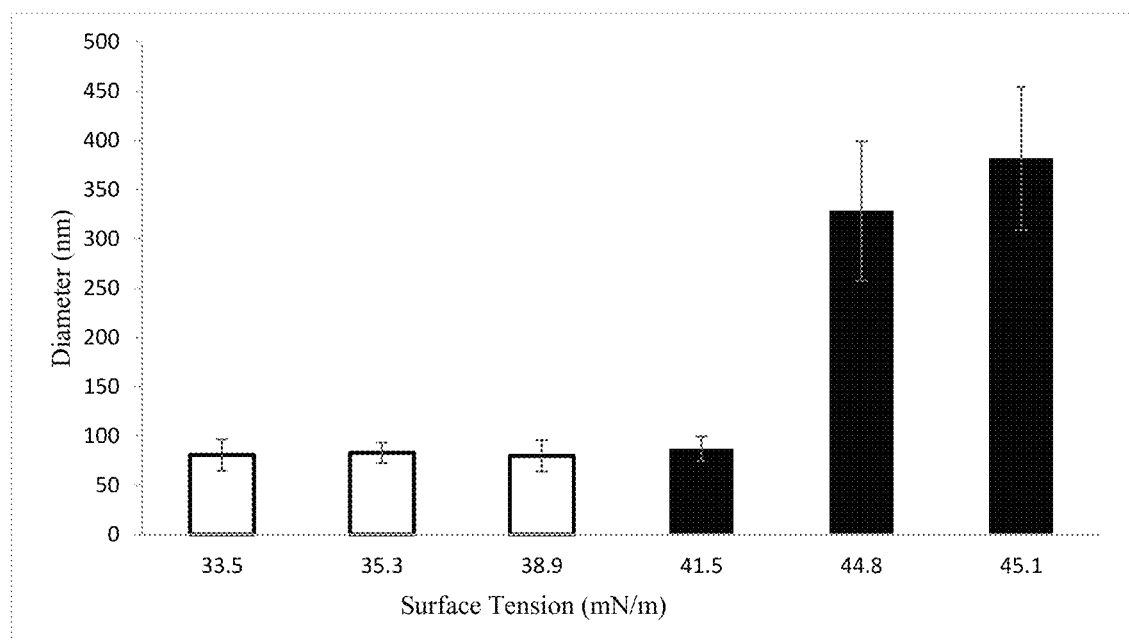
FIG. 14 illustrates a bar chart of average diameters of the electrospun tragacanthin-PVA nanofibrous webs versus surface tensions of tragacanthin-PVA solutions, consistent with one or more exemplary embodiments of the present disclosure.

FIG. 14 illustrates a bar chart of average diameters of the electrospun tragacanthin-PVA nanofibrous webs versus surface tensions of tragacanthin-PVA solutions, consistent with one or more exemplary embodiments of the present disclosure. Referring to FIG. 14, it is evident that an increase in surface tension of an exemplary tragacanthin-PVA solution may play a prominent role in increasing the average diameter of an exemplary electrospun tragacanthin-PVA nanofiber.

Figure 15:
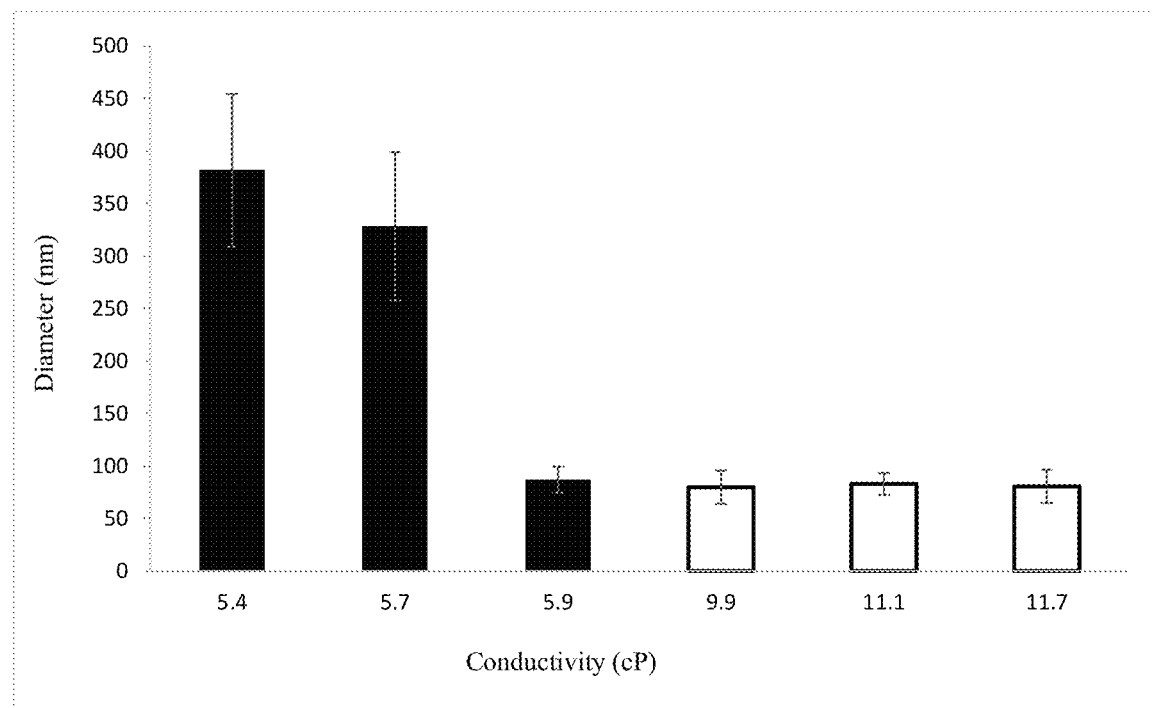
FIG. 15 illustrates a bar chart of average diameters of the electrospun tragacanthin-PVA nanofibrous webs versus conductivities of tragacanthin-PVA solutions, consistent with one or more exemplary embodiments of the present disclosure.

FIG. 15 illustrates a bar chart of average diameters of the electrospun tragacanthin-PVA nanofibrous webs versus conductivities of tragacanthin-PVA solutions, consistent with one or more exemplary embodiments of the present disclosure. Referring to FIG. 15, it is evident that an increase in electrical conductivity of an exemplary tragacanthin-PVA solution may reduce the average diameter of an exemplary electrospun tragacanthin-PVA nanofiber.

Figure 16:
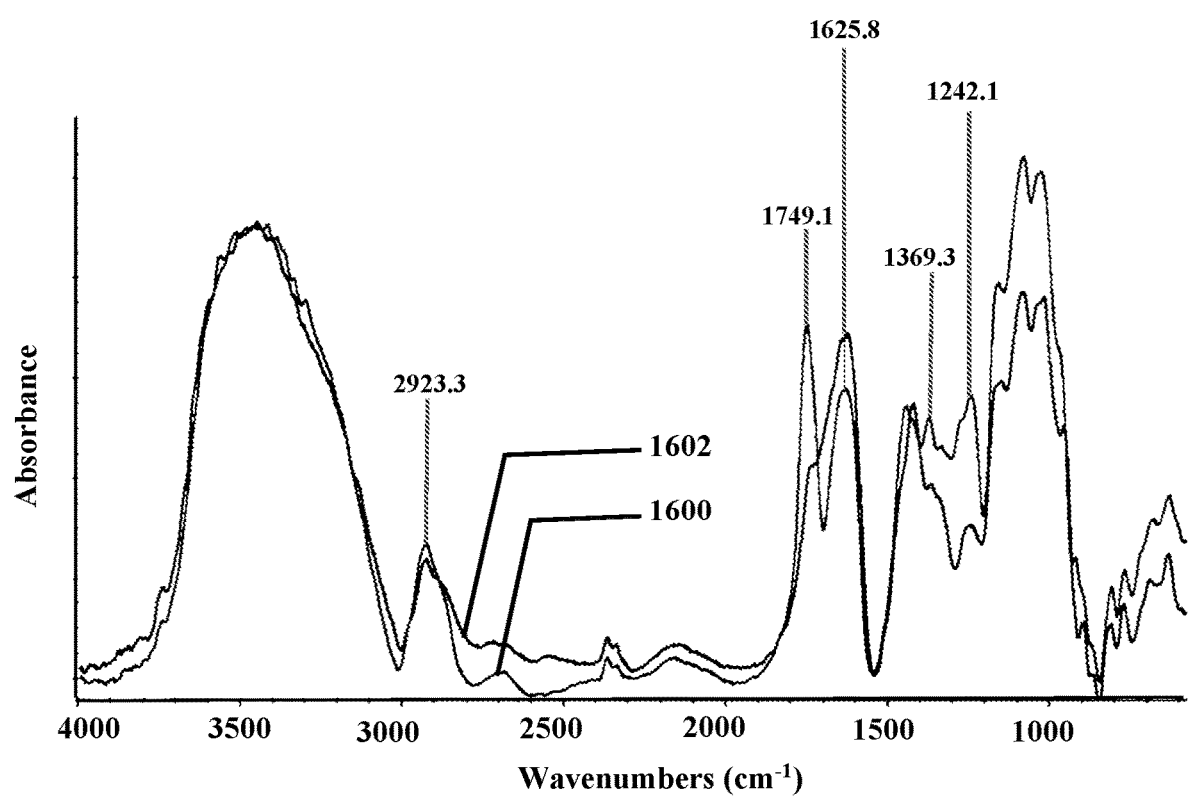
FIG. 16 illustrates FT-IR spectra of pure tragacanth and tragacanthin, consistent with one or more exemplary embodiments of the present disclosure.

FIG. 16 illustrates FT-IR spectra of pure tragacanth (1600) and tragacanthin (1602), consistent with one or more exemplary embodiments of the present disclosure. In the 3000-3700 cm$^{-1}$ region, the peaks are related to the asymmetric stretching vibrations of the OH groups. The peaks in the 2800-2950 cm$^{-1}$ region are attributed to the symmetric and asymmetric stretching vibrations of the C—H bond. At 1750 cm$^{-1}$, the peak is related to the C═O (asymmetric stretching) group in galacturonic acid and its esters. The peak at 1622 cm$^{-1}$ corresponds to the asymmetric stretching vibrations of the carboxylate group. The absorption bands at 1039 cm$^{-1}$ and 1080 cm$^{-1}$ shows the galactose group, which contains polysaccharides such as arabinogalactans. The peaks related to poly-galacturonic acids are seen at the 1100-1017 cm$^{-1}$ region. Moreover, the peaks at 808 cm$^{-1}$ and 898 cm$^{-1}$ indicate the presence of a anomer and β anomer, respectively. Referring to FIG. 16, it is evident that a peak at 1750 cm$^{-1}$, related to tragacanth, is missing in the tragacanthin spectrum 1602. Moreover, the decrease of the intensity of the peak at 1245 cm$^{-1}$, as well as the increase of peak intensity at 1622 cm$^{-1}$, reflects a reduction of a number of ester groups and an increase in a number of carboxylate groups. These changes are related to a pH effect. Changes in carboxyl groups represent a high degree of saponification.

Figure 17A:
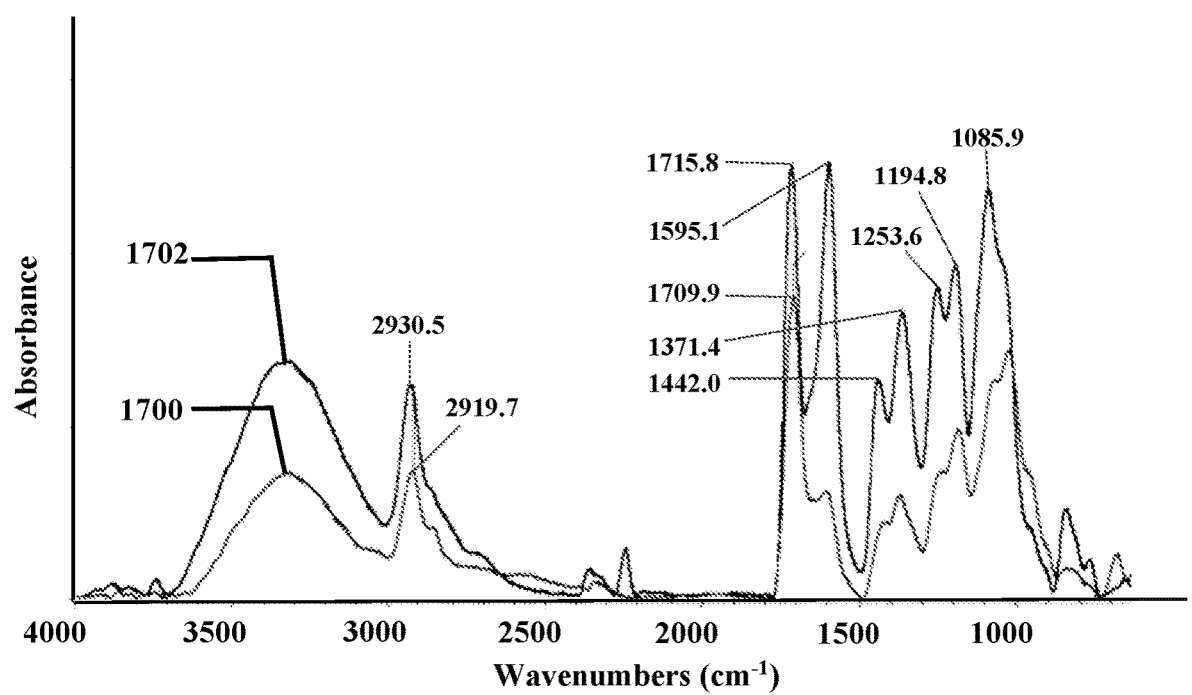
FIG. 17A illustrates FT-IR spectra of tragacanthin-PVA nanofibers WST/PVA (70:30) and a cross-linked tragacanthin-PVA nanofibers WST/PVA (70:30), consistent with one or more exemplary embodiments of the present disclosure.

FIG. 17A illustrates FT-IR spectra of tragacanthin-PVA nanofibers WST/PVA (70:30) (1700) and a cross-linked tragacanthin-PVA nanofibers WST/PVA (70:30) (1702), consistent with one or more exemplary embodiments of the present disclosure. Referring to FIG. 17A, it is evident that glutaraldehyde reacts with tragacanthin OH groups, resulting in a formation of acetate bonds. A carbonyl group of an acetate bond at 1595 cm$^{-1}$ and peaks at 1253 cm$^{-1}$ and 1086 cm$^{-1}$ are related to symmetric and asymmetric stretching vibrations of an acetate C—O—C group, confirming a crosslinking between tragacanthin-tragacanthin as well as tragacanthin-polyvinyl alcohol. This shows the formation of hydrogel nanofibers, which can be held responsible for higher water absorption.

Figure 17B:
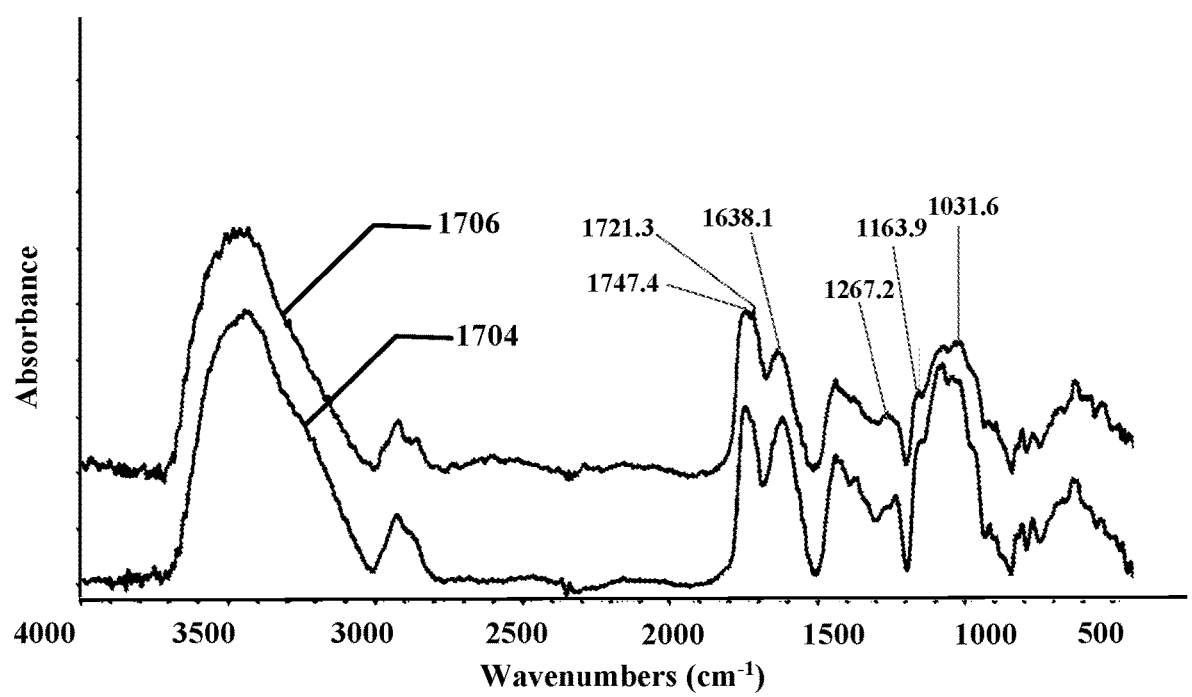
FIG. 17B illustrates an infrared spectrum of pure tragacanth nanofibers before cross-linking with glutaraldehyde and an infrared spectrum of pure tragacanth nanofibers after cross-linking with glutaraldehyde, consistent with one or more exemplary embodiments of the present disclosure.

FIG. 17B illustrates an infrared spectrum 1704 of pure tragacanth nanofibers before cross-linking with glutaraldehyde and an infrared spectrum 1706 of pure tragacanth nanofibers after cross-linking with glutaraldehyde, consistent with one or more exemplary embodiments of the present disclosure. Referring to FIG. 17B, it is evident that a height of a peak at 1721 cm$^{-1}$ (related to a carbonyl of an acetate group of the cross-linked tragacanth) is increased in comparison to a peak at 1747 cm$^{-1}$ (which is related to carboxylic groups in tragacanth). At the same time, an amplitude of a peak at 1638 cm$^{-1}$ (O—C═O asymmetric) decreases, indicating the formation of cross-links between tragacanth chains and glutaraldehyde. Also, two symmetric and asymmetric C—O—C vibrational peaks at 1163 cm$^{-1}$ and 1257 cm$^{-1}$ in a region of 1000-1200 cm$^{-1}$ further emphasize the formation of an acetate bond. It is noteworthy that an amplitude of a C—OH peak at 1032 cm$^{-1}$ is decreased, which is related to the formation of cross-links.

Figure 17C:
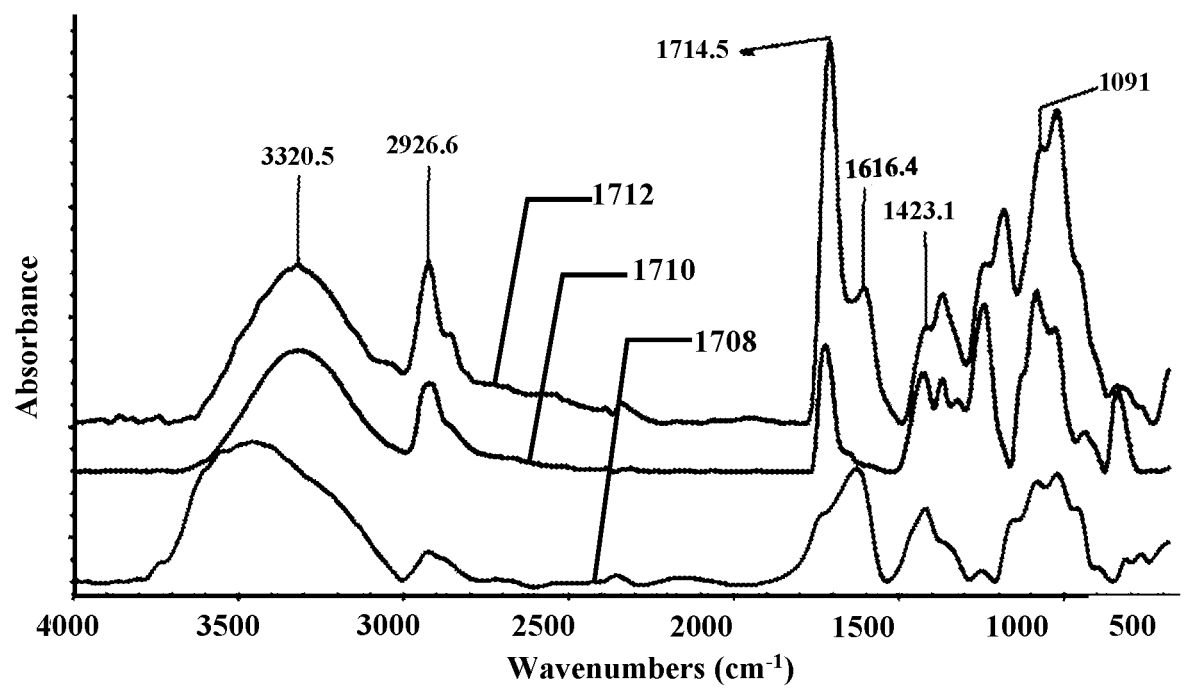
FIG. 17C illustrates FT-IR spectra of pure tragacanthin, PVA nanofibers, and tragacanthin-PVA nanofibers WST/PVA (80:20), consistent with one or more exemplary embodiments of the present disclosure.

FIG. 17C illustrates FT-IR spectra of pure tragacanthin (1708), PVA nanofibers (1710), and tragacanthin-PVA nanofibers WST/PVA (80:20) (1712), consistent with one or more exemplary embodiments of the present disclosure. Comparing infrared spectrum 1712 of the nanofibers of tragacanthin-polyvinyl alcohol, infrared spectrum 1708 of tragacanthin and infrared spectrum 1710 of PVA, it is evident that in the tragacanthin spectrum 1708, the peak in the 3000-3700 cm$^{-1}$ region relates to OH groups and the peak at 2950 cm$^{-1}$ is related to C—H stretching vibration peak. Furthermore, at 1622 cm$^{-1}$, the asymmetric stretching vibrations of the carboxylate group can be observed. In spectrum 1710 of polyvinyl alcohol nanofibers, three regions can be seen, a distinct peak is observed in the first region, at a distance of 3000-3500 cm$^{-1}$, which is related to the stretching vibrations of the hydroxyl groups in the intramolecular hydrogen bonds, showing the inadequate degree of hydrolysis of the polyvinyl alcohol in this invention. Also, the peak at 1091 cm$^{-1}$ is attributed to the vibrations associated with C—O from the second type of alcohol in polyvinyl alcohol. In spectrum 1712 of polyvinyl alcohol-tragacanthin nanofibers, the peak at 1622 cm$^{-1}$ relates to the stretching vibrations of the carboxylate group in tragacanthin. The peak at 1720 cm$^{-1}$ in the polyvinyl alcohol spectrum is attributed to the C═O acetate group, which can be observed in polyvinyl alcohol-tragacanthin spectrum 1712 in the 1714 cm$^{-1}$ region, which can be a reason for the presence of polyvinyl alcohol in the polyvinyl alcohol-tragacanthin scaffold. It is also observed that the peak at the 300-3700 cm' region, which is related to the stretching vibrations of the OH group, has been widened by adding polyvinyl alcohol to the right side; this is due to the interactions and hydrogen bonds between the OH groups in polyvinyl alcohol and aldehyde or OH groups in tragacanthin.

Figure 18:
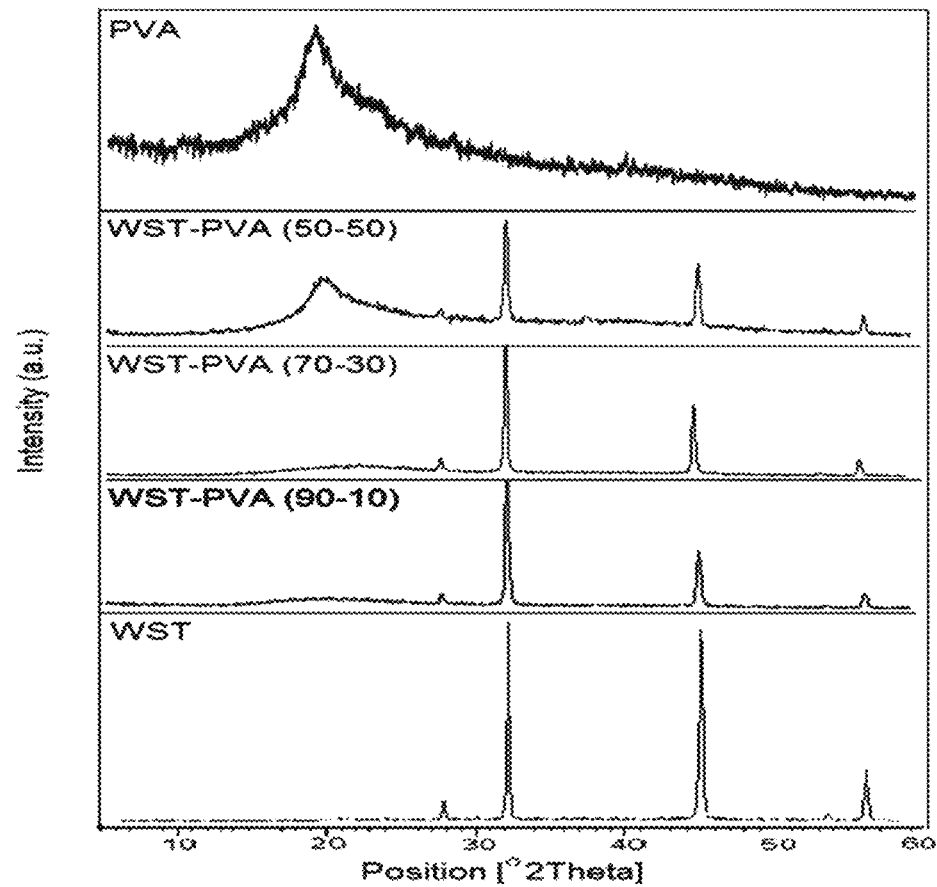
FIG. 18 illustrates X-ray diffraction patterns of pure tragacanthin, PVA nanofibers, tragacanthin-PVA nanofibers WST/PVA (50:50), WST/PVA (70:30), and WST/PVA (90:10), consistent with one or more exemplary embodiments of the present disclosure.

FIG. 18 illustrates X-ray diffraction patterns of pure tragacanth, PVA nanofibers, tragacanthin-PVA nanofibers WST/PVA (50:50), WST/PVA (70:30), and WST/PVA (90:10), consistent with one or more exemplary embodiments of the present disclosure. Referring to FIG. 18, it is evident that characteristic peaks of tragacanthin are repeated in this spectrum. In general, it can be said that in tragacanthin-polyvinyl alcohol nanofibers, the presence of polyvinyl alcohol, next to tragacanthin, does not have a significant effect on the microstructure of tragacanthin. It is further evident that the microstructure of tragacanthin-polyvinyl alcohol nanofibers gets closer to that of tragacanthin as the amount of polyvinyl alcohol is decreased. It is worth mentioning that highly sharp peaks with high intensity and low width indicate a high degree of crystallinity, showing large crystallites with a highly aligned orientation, relative to a fiber axis.

Table 4 reports percentages of crystallinity of pure tragacanth nanofibres, pure tragacanthin, PVA nanofibers, tragacanthin-PVA nanofibers WST/PVA (50:50), WST/PVA (70:30), and WST/PVA (90:10).

TABLE 4

| Crystallinity Percentage | |
|---|---|
| Sample type | Crystallinity (%) |
| Pure tragacanth nanofibers | 17 |
| Tragacanthin | 90 |
| Polyvinyl alcohol nanofibers | 51.65 |
| WST/PVA (50:50) nanofibers | 75 |
| WST/PVA (70:30) nanofibers | 88 |
| WST/PVA (90:10) nanofibers | 90 |

EXAMPLE 4

In this example, as-prepared filters containing tragacanthin-PVA nanofibrous webs were utilized in a filtration cell to separate water from an exemplary sample of petroleum. Here, tragacanthin-PVA nanofibrous webs which were electrospun on PAN-coated stainless steel meshes were cut into thin disk-shaped filters with diameters of approximately 5 cm. In this example, a filtration device similar to the filtration device of FIG. 10 was utilized. Each of the exemplary thin disk-shaped filters was placed within filtration device 1000 such that any fluid entering filtration device 1000 may only flow through each exemplary thin disk-shaped filter to exit or be discharged from filtration device 1000. Here, 10 cm³ of a petroleum sample was injected into filtration device 1000, after passing through the exemplary thin disk-shaped filter, the petroleum sample was discharged from filtration device 1000. The discharged petroleum sample was then be transferred to a Karl-Fischer device for measuring the remaining water content of the discharged petroleum sample.

Two types of fuel were filtered utilizing filtration device 1000, namely a JP4 fuel and diesel fuel. The water-contents of both fuels before and after filtration were determined by a Karl-Fischer device according to the ASTM D-6304 standard. The amounts of water content in JP4 and diesel fuels before filtration were 130 ppm and 178.25 ppm, respectively. Table 5 summarizes the filtration efficiencies and volumetric flow rates of the exemplary electrospun tragacanthin-PVA nanofibrous webs for JP4 fuel. Table 6 summarizes the filtration efficiencies and volumetric flow rates of the exemplary electrospun tragacanthin-PVA nanofibrous webs for diesel fuel.

from JP4 fuel samples, consistent with one or more exemplary embodiments of the present disclosure. FIG. 19B shows a bar chart of volumetric flow rates for the exemplary electrospun tragacanthin-PVA nanofibrous webs and a pure tragacanth nanofibrous web for separating water from JP4 fuel samples, consistent with one or more exemplary embodiments of the present disclosure.

Figure 20A:
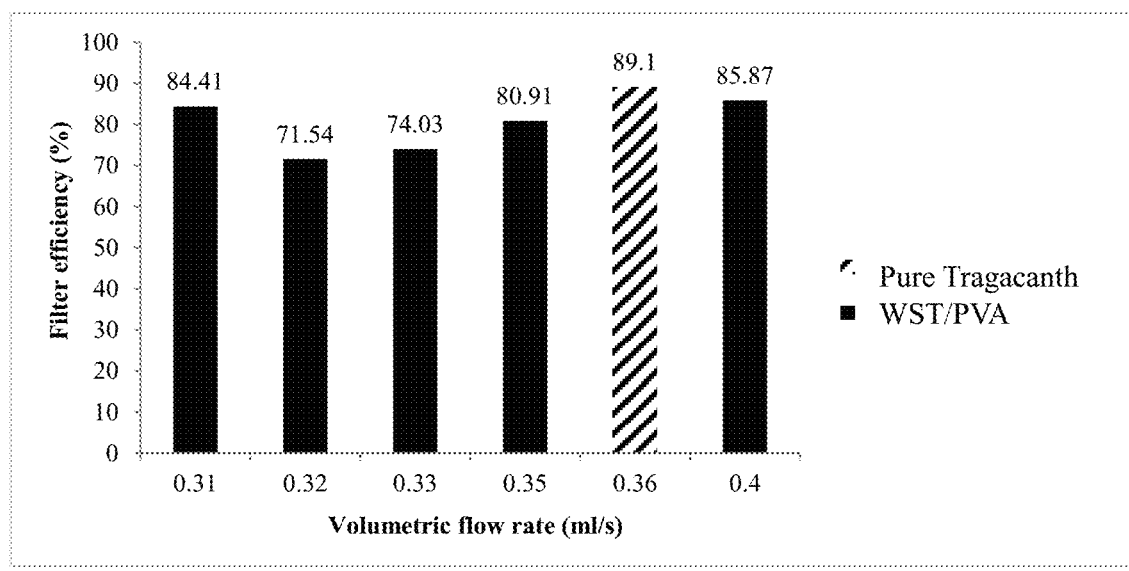
FIG. 20A shows a bar chart of filter efficiencies versus volumetric flow rates for an exemplary WST/PVA (70:30) nanofibrous web and a pure tragacanth nanofibrous web for separating water from JP4 fuel samples, consistent with one or more exemplary embodiments of the present disclosure.
Figure 20B:
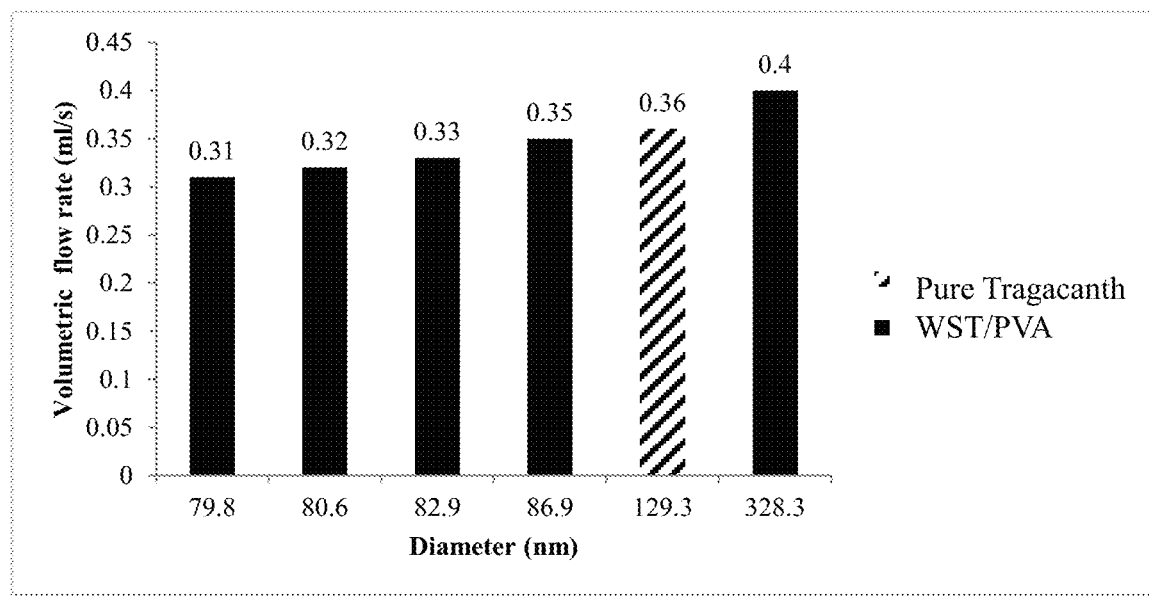
FIG. 20B shows a bar chart of volumetric flow rates versus average diameters for the exemplary WST/PVA (70:30) nanofibrous web and a pure tragacanth nanofibrous web for separating water from JP4 fuel samples, consistent with one or more exemplary embodiments of the present disclosure.
Figure 20C:
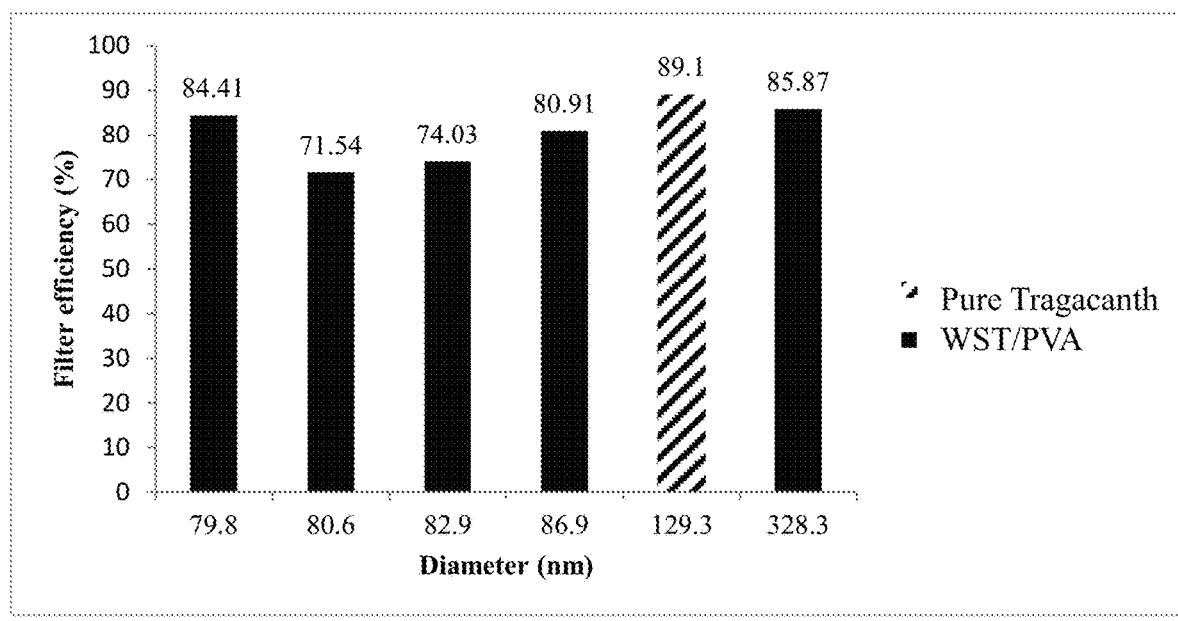
FIG. 20C shows a bar chart of filter efficiencies versus average diameters for the exemplary WST/PVA (70:30) nanofibrous web and a pure tragacanth nanofibrous web for separating water from JP4 fuel samples, consistent with one or more exemplary embodiments of the present disclosure.

FIG. 20A shows a bar chart of filter efficiencies versus volumetric flow rates for the exemplary WST/PVA (70:30) nanofibrous web and a pure tragacanth nanofibrous web for separating water from JP4 fuel samples, consistent with one or more exemplary embodiments of the present disclosure. FIG. 20B shows a bar chart of volumetric flow rates versus average diameters for the exemplary WST/PVA (70:30) nanofibrous web and a pure tragacanth nanofibrous web for separating water from JP4 fuel samples, consistent with one or more exemplary embodiments of the present disclosure. FIG. 20C shows a bar chart of filter efficiencies versus average diameters for the exemplary WST/PVA (70:30) nanofibrous web for separating water from JP4 fuel samples, consistent with one or more exemplary embodiments of the present disclosure. Referring to FIG. 20A, with the exception of WST/PVA (70:30) nanofibrous web, for the other four samples, a higher volumetric flow rate significantly improves filtration efficiency. Referring to FIG. 20B, it is evident that the volumetric flow rate is a function of the

TABLE 5

Filtration efficiency and volumetric flow rate of tragacanthin -PVA filters for the JP4 fuel 10 cm³.

| Filter type | Diameter of nanofibers filter (nm) | Weight of filtering layer (g) | Water content after filtration (ppm) | Water absorbed by filter (ppm) | Volumetric flow rate) cm³/s( | Filtration efficiency (%) |
|---|---|---|---|---|---|---|
| WST/PVA 50/50 | 328.3 | 0.0034 | 18.37 | 111.63 | 0.4 | 85.87 |
| WST/PVA 60/40 | 86.9 | 0.0028 | 24.82 | 105.18 | 0.35 | 80.91 |
| WST/PVA 70/30 | 79.8 | 0.0042 | 20.27 | 109.73 | 0.31 | 84.41 |
| WST/PVA 80/20 | 82.9 | 0.0014 | 33.76 | 96.24 | 0.33 | 74.03 |
| WST/PVA 90/10 | 80.6 | 0.0012 | 37 | 93 | 0.32 | 71.54 |

TABLE 6

Filtration efficiency and volumetric flow rate of tragacanthin -PVA filters for the diesel fuel 10 cm³.

| Filter type | Diameter of filter nanofiber (nm) | Weight of filtering layer (g) | Water content after filtration (ppm) | Water absorbed by filter (ppm) | Volumetric flow rate (cm³/s) | Filtration efficiency (%) |
|---|---|---|---|---|---|---|
| WST/PVA 50/50 | 328.3 | 0.0034 | 19.62 | 158.63 | 0.16 | 88.99 |
| WST/PVA 60/40 | 86.9 | 0.0028 | 28.86 | 149.39 | 0.10 | 83.81 |
| WST/PVA 70/30 | 79.8 | 0.0042 | 24.05 | 154.2 | 0.12 | 86.51 |
| WST/PVA 80/20 | 82.9 | 0.0014 | 29.75 | 148.5 | 0.13 | 83.31 |
| WST/PVA 90/10 | 80.6 | 0.0012 | 33.46 | 144.79 | 0.11 | 81.23 |

Figure 19A:
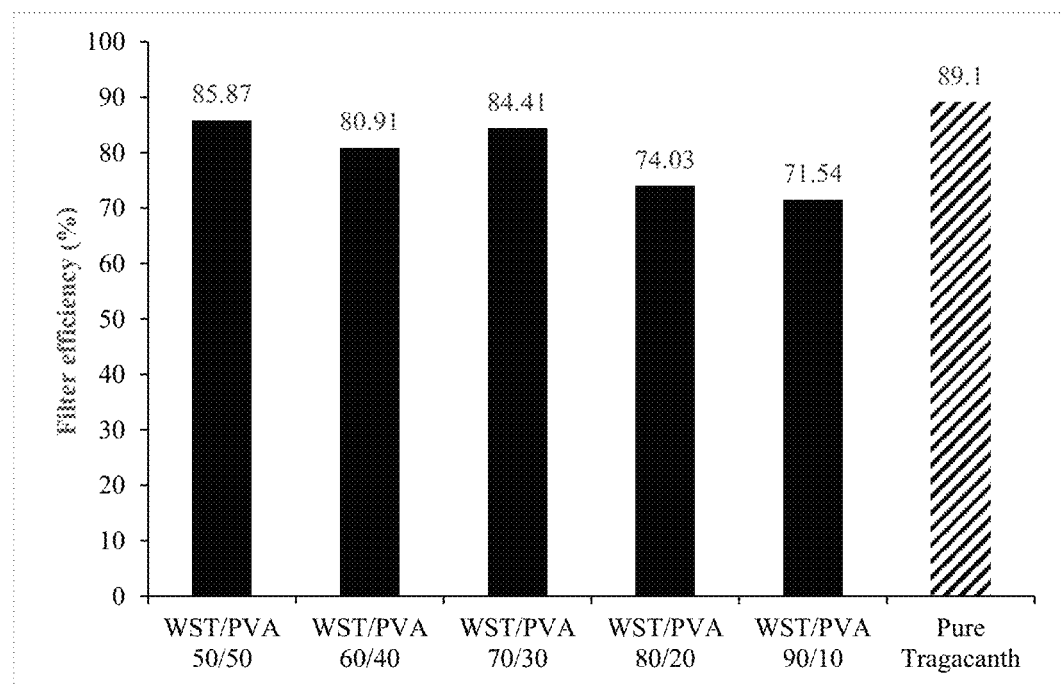
FIG. 19A shows a bar chart of filter efficiencies for the exemplary electrospun tragacanthin-PVA nanofibrous webs and a pure tragacanth nanofibrous web for separating water from JP4 fuel samples, consistent with one or more exemplary embodiments of the present disclosure.
Figure 19B:
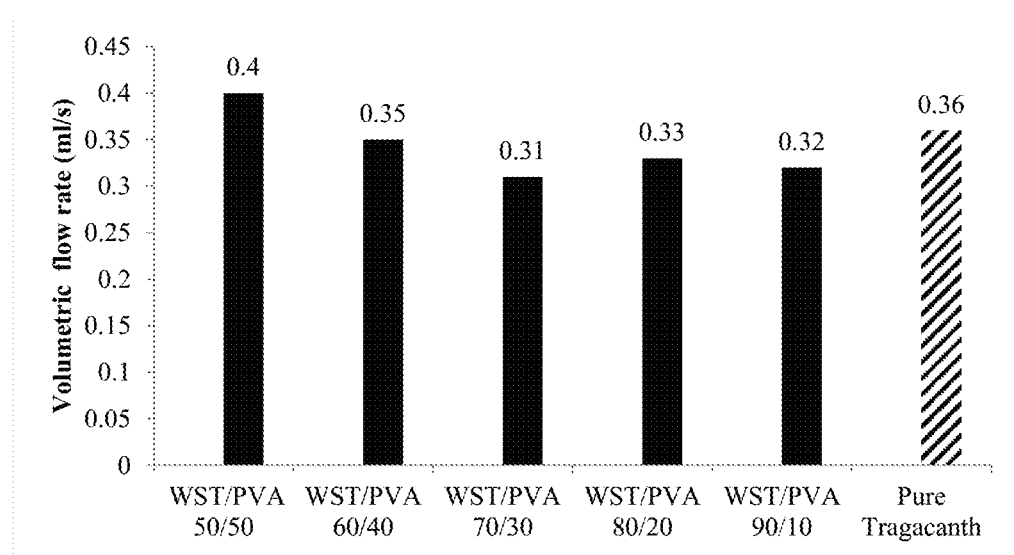
FIG. 19B shows a bar chart of volumetric flow rates for the exemplary electrospun tragacanthin-PVA nanofibrous webs and a pure tragacanth nanofibrous web for separating water from JP4 fuel samples, consistent with one or more exemplary embodiments of the present disclosure.

FIG. 19A shows a bar chart of filter efficiencies for the exemplary electrospun tragacanthin-PVA nanofibrous webs and a pure tragacanth nanofibrous web for separating water diameter of nanofibers. Moreover, the porosity of the nanofibrous web increases with a higher nanofiber diameter. Therefore, it may be concluded that filtration efficiency is a function of the diameter of the nanofibers forming the filter. Referring to FIG. 20C, it is evident that filtration efficiency is a function of the diameter of the nanofibers forming the filter except for WST/PVA (70:30) nanofibrous web.

Figure 21A:
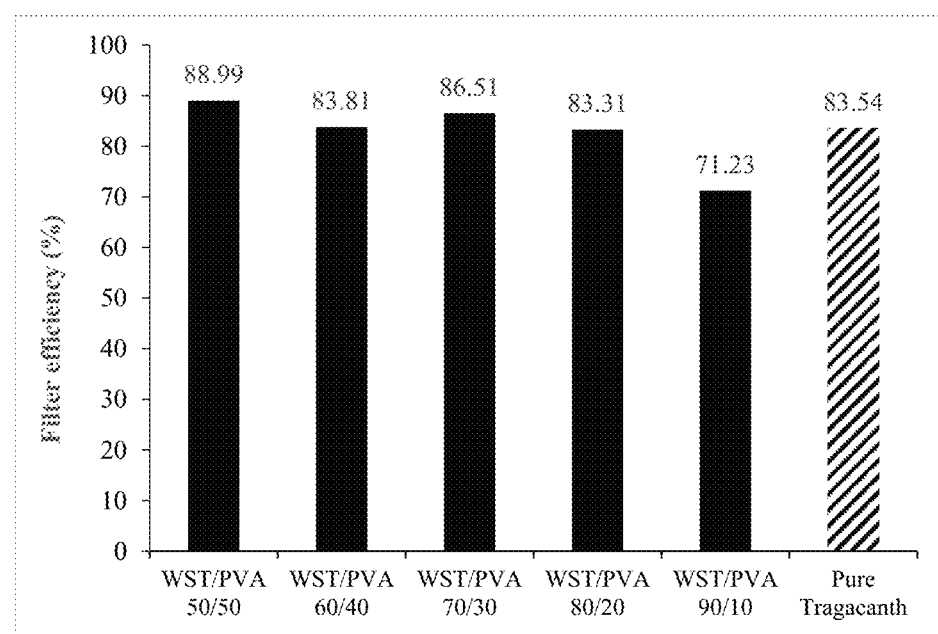
FIG. 21A shows a bar chart of filter efficiencies for the exemplary electrospun tragacanthin-PVA nanofibrous webs and a pure tragacanth nanofibrous web for separating water from diesel fuel samples, consistent with one or more exemplary embodiments of the present disclosure.
Figure 21B:
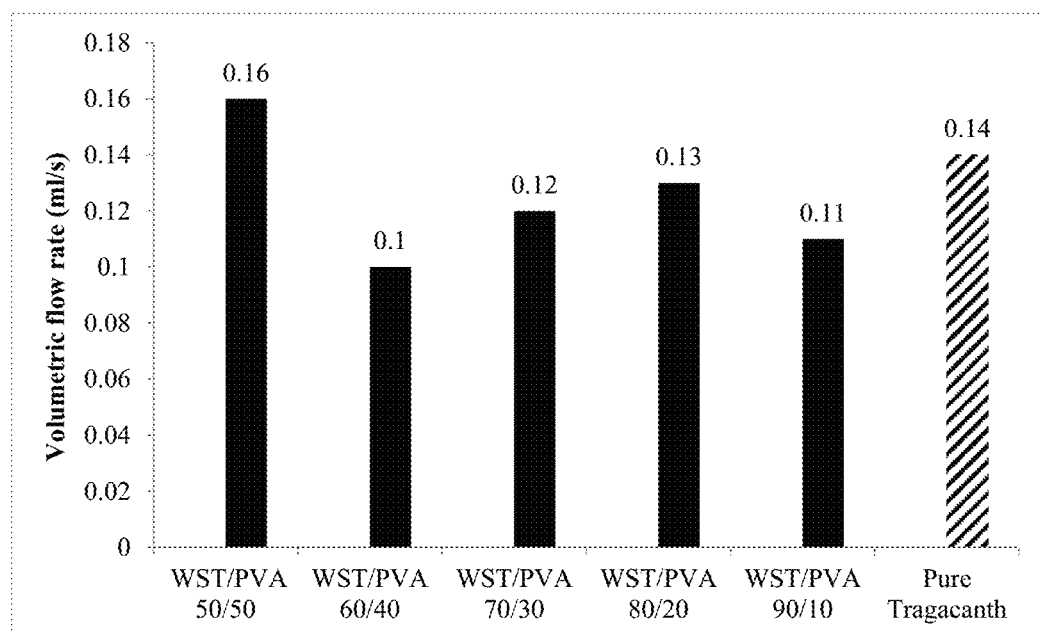
FIG. 21B shows a bar chart of volumetric flow rates for the exemplary electrospun tragacanthin-PVA nanofibrous webs and a pure tragacanth nanofibrous web for separating water from diesel fuel samples, consistent with one or more exemplary embodiments of the present disclosure.

FIG. 21A shows a bar chart of filter efficiencies for the exemplary electrospun tragacanthin-PVA nanofibrous webs and a pure tragacanth nanofibrous web for separating water from diesel fuel samples, consistent with one or more exemplary embodiments of the present disclosure. FIG. 21B shows a bar chart of volumetric flow rates for the exemplary electrospun tragacanthin-PVA nanofibrous webs and a pure tragacanth nanofibrous web for separating water from diesel fuel samples, consistent with one or more exemplary embodiments of the present disclosure.

Figure 22A:
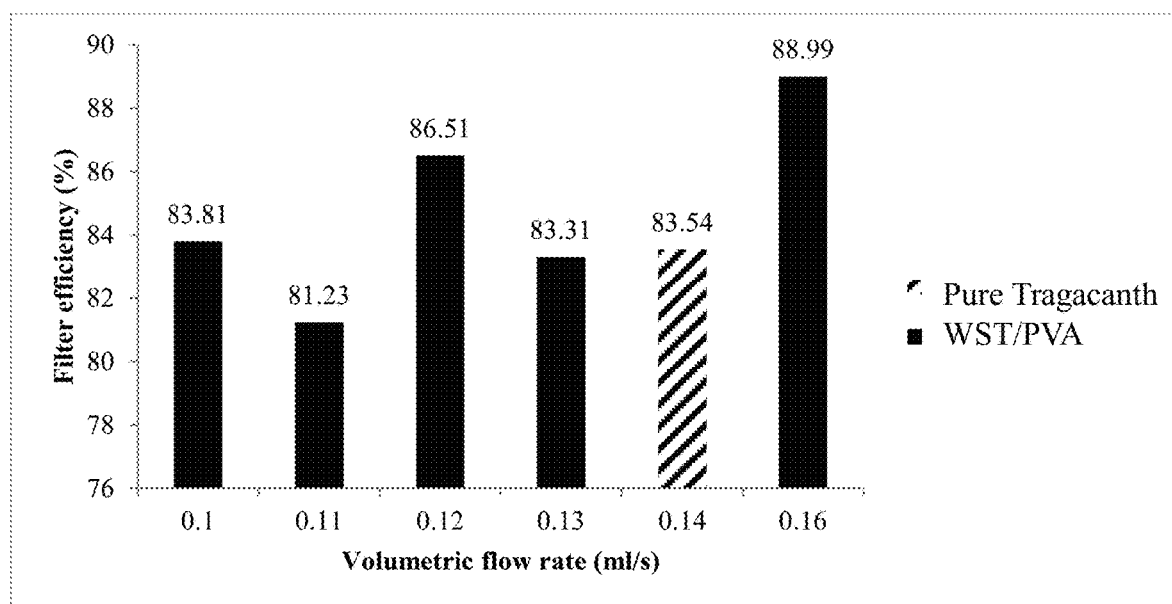
FIG. 22A shows a bar chart of filter efficiencies versus volumetric flow rates for the exemplary WST/PVA (70:30) nanofibrous web and a pure tragacanth nanofibrous web for separating water from diesel fuel samples, consistent with one or more exemplary embodiments of the present disclosure.
Figure 22B:
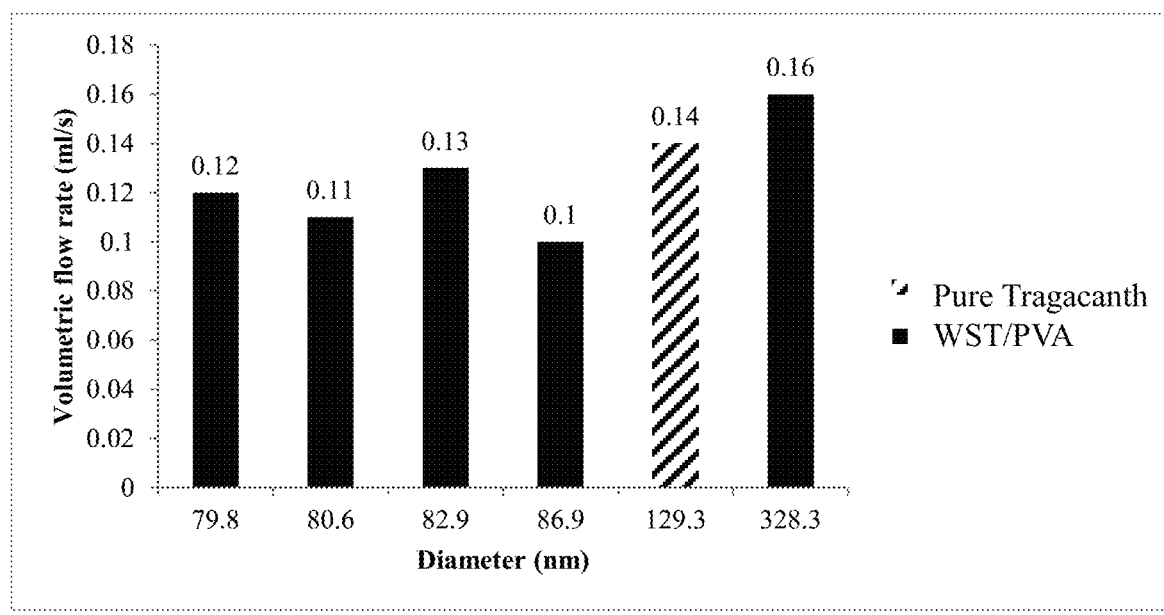
FIG. 22B shows a bar chart of volumetric flow rates versus average diameters for the exemplary WST/PVA (70:30) nanofibrous web and a pure tragacanth nanofibrous web for separating water from diesel fuel samples, consistent with one or more exemplary embodiments of the present disclosure.
Figure 22C:
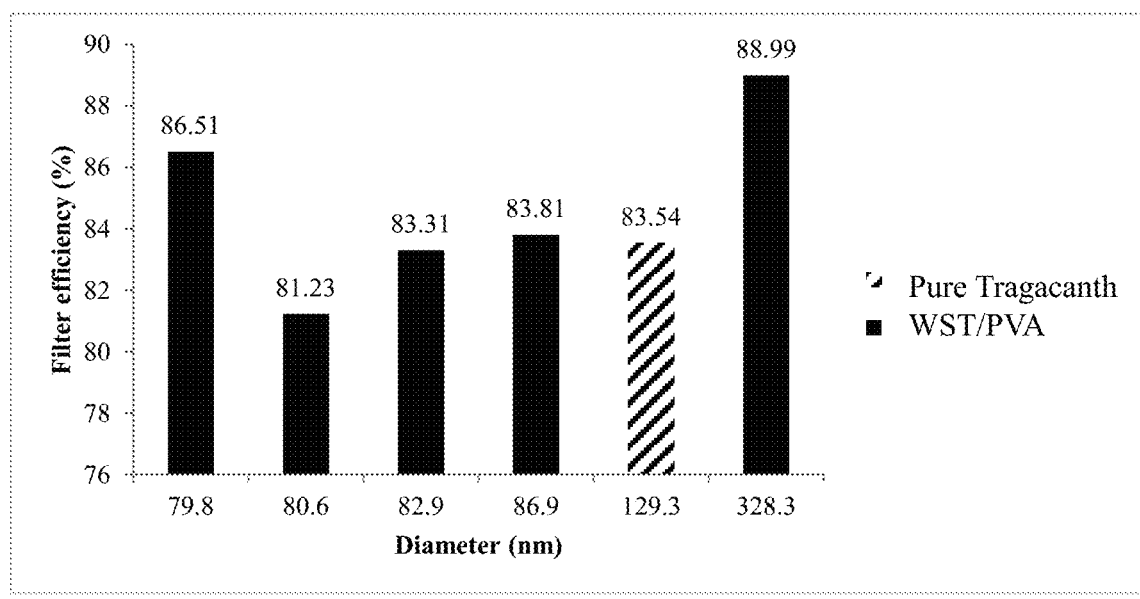
FIG. 22C shows a bar chart of filter efficiencies versus average diameters for the exemplary electrospun (WST/PVA (70:30) nanofibrous web and a pure tragacanth nanofibrous web for separating water from diesel fuel samples, consistent with one or more exemplary embodiments of the present disclosure.

FIG. 22A shows a bar chart of filter efficiencies versus volumetric flow rates for the exemplary WST/PVA (70:30) nanofibrous web and a pure tragacanth nanofibrous web for separating water from diesel fuel samples, consistent with one or more exemplary embodiments of the present disclosure. FIG. 22B shows a bar chart of volumetric flow rates versus average diameters for the exemplary WST/PVA (70:30) nanofibrous web and a pure tragacanth nanofibrous web for separating water from diesel fuel samples, consistent with one or more exemplary embodiments of the present disclosure. FIG. 22C shows a bar chart of filter efficiencies versus average diameters for the exemplary WST/PVA (70:30) nanofibrous web and a pure tragacanth nanofibrous web for separating water from diesel fuel samples, consistent with one or more exemplary embodiments of the present disclosure. Referring to FIGS. 20A-C and FIGS. 22A-C, it is evident that for both JP4 and diesel fuels, filtration efficiency improves as the diameter of nanofiber forming the filters increases. WST/PVA (70:30) nanofibrous web is, however, an exception. Considering the crystallinity of nanofibers (Table 4) and filtration efficiency (Tables 5 and 6), it can be said that filtration efficiency is enhanced with decreasing crystallization. In other words, the increase of amorphous regions enhances hydrophilicity and hence, filtration efficiency. It is concluded that a pure tragacanth sample with a crystallinity of 17% and a weight of 0.0006 g is an optimum filter for JP4 fuel with the highest efficiency of 89.1% in the first cycle. On the other hand, the WST/PVA (50:50) nanofibrous web with a crystallinity of 75% and a weight of 0.0034 g has the highest efficiency of 88.99% for the diesel fuel in the first cycle. It should be noted that a second or a third filtration of the already filtered JP4 and diesel fuels with the already used filter (recovered or not recovered) produced in this invention reduces the water content of JP4 and diesel fuels to zero.

Figure 23:
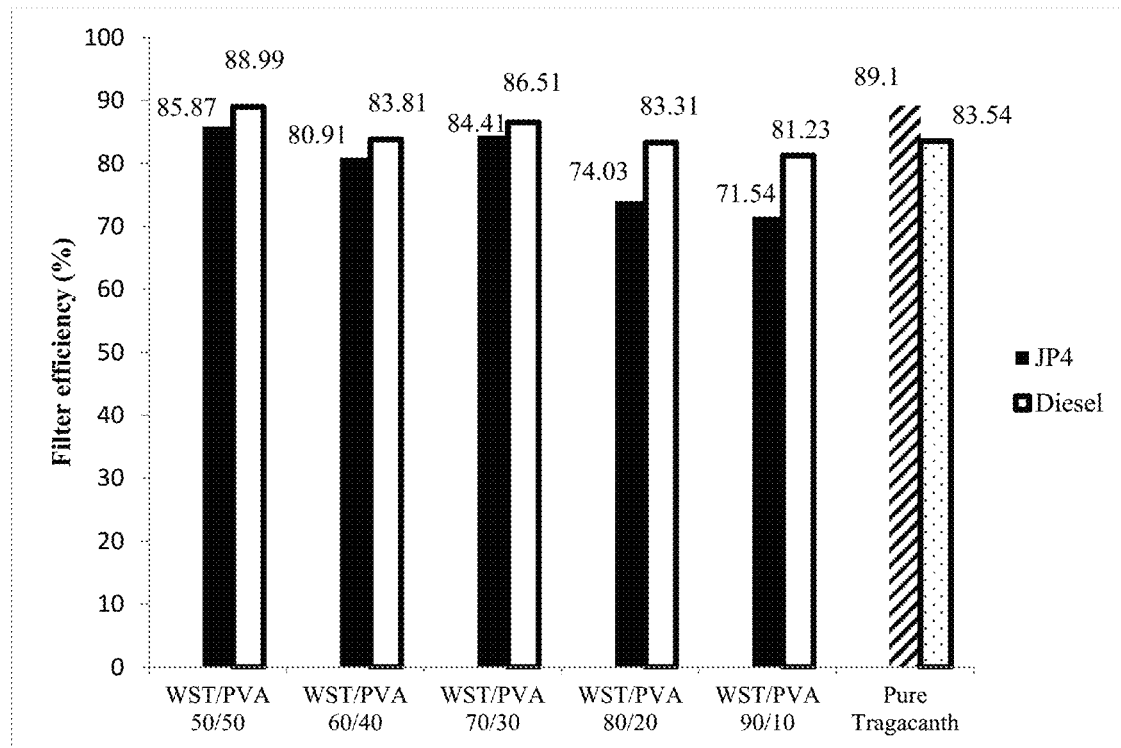
FIG. 23 illustrates a bar chart of filter efficiency of the electrospun nanofibrous webs for separating water from JP4 fuels and diesel fuel samples, consistent with one or more exemplary embodiments of the present disclosure.

FIG. 23 illustrates a bar chart of filter efficiency of the electrospun nanofibrous webs for separating water from JP4 fuels and diesel fuel samples, consistent with one or more exemplary embodiments of the present disclosure. Referring to FIG. 23, it is evident that a WST/PVA (50:50) nanofibrous web shows a higher filtration efficiency for filtering water from the diesel fuel. However, for a JP4 fuel, a pure tragacanth filter has a higher filtration efficiency. This may relate to parameters such as viscosity, the surface tension of the fuel, and surface energy of the filter surface.

Another factor that may affect filtration efficiency is the porosity of the electrospun nanofibrous webs, which in turn, determines the permeability of the nanofibrous webs. The higher the permeability of a nanofibrous web, the lower the pressure drop through that nanofibrous web. Air permeabilities of the electrospun nanofibrous webs were measured to investigate the porosity of the as-prepared electrospun nanofibrous webs. Table 7 summarizes the air permeability of tragacanthin-PVA filters, pure tragacanth filter, and polyacrylonitrile nanofibrous support layer.

TABLE 7

Air permeability of tragacanthin-PVA filters, pure tragacanthin, and polyacrylonitrile.

| Filter type | Diameter of filter nanofiber (nm( | Pressure (Pa) | | |
|---|---|---|---|---|
| | | 100 | 200 | 500 |
| WST/PVA 50/50 | 328.3 | 6.7 | 13.8 | 34.8 |
| WST/PVA 60/40 | 86.9 | 3.8 | 7.2 | 13.1 |
| WST/PVA 70/30 | 79.8 | 0.2 | 0.4 | 0.9 |
| WST/PVA 80/20 | 82.9 | 3.3 | 6.8 | 12.1 |
| Pure tragacanth | 129.3 | 4.9 | 10.5 | 25.6 |
| Polyacrylonitrile | 415.5 | 6.3 | 14 | 37.3 |

Referring to Table 7, it is evident that a decrease in the diameter of nanofibers in all three pressures of 100, 200, and 500 Pa, air permeability decreases. For example, tragacanthin-PVA filter WST/PVA (50/50) with a diameter of approximately 328.3 nm shows the highest air permeability and tragacanthin-PVA filter WST/PVA (70/30) with a diameter of approximately 79.8 nm shows the lowest air permeability. With an increase in air permeability of a filter, pressure drop on both sides of that filter decreases, which eventually may lead to an increase in the filtration efficiency of that filter. It can be concluded that reducing the diameter of nanofiber in the nanofiber layer creates smaller spaces and ultimately, higher porosity. Lower air permeability reduces the filtration efficiency and the lifetime of filters. Of course, this depends on the type of fluid.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for fabricating a filter containing tragacanthin-polyvinyl alcohol (PVA) nanofibers, the method comprising:
    obtaining a homogenous tragacanthin-PVA solution by:
        obtaining a PVA solution by dissolving PVA in distilled water; and
        adding tragacanthin to the PVA solution, a concentration of tragacanthin in the homogenous tragacanthin-PVA solution being between 1 w/v % and 1.7 w/v %;
    obtaining a support layer by coating a stainless steel mesh with a thin layer of a hydrophobic polymer; and
    forming a tragacanthin-PVA nanofibrous web on the support layer by electrospinning the homogenous tragacanthin-PVA solution onto the support layer.

2. The method of claim 1, further comprising cross-linking the tragacanthin-PVA nanofibrous web by exposing the tragacanthin-PVA nanofibrous web to a saturated vapor of a cross-linking agent.

3. The method of claim 2, wherein coating the stainless steel mesh with the thin layer of the hydrophobic polymer comprises electrospinning a polyacrylonitrile (PAN) solution onto the stainless steel mesh.

4. The method of claim 3, wherein electrospinning the PAN solution onto the stainless steel mesh comprises electrospinning the PAN solution with a mass concertation of 16 w/v % onto the stainless steel mesh.

5. The method of claim 2, wherein adding tragacanthin to the PVA solution comprises mixing tragacanthin powder with the PVA solution such that a mass ratio of tragacanthin to PVA between 10 to 90 (mass of tragacanthin to mass of PVA) and 90 to 10.

6. The method of claim 2, wherein adding tragacanthin to the PVA solution comprises adding tragacanthin to the PVA solution with a mass ratio of tragacanthin to PVA between 10 to 90 and 60 to 40.

7. The method of claim 2, wherein adding tragacanthin to the PVA solution comprises adding tragacanthin to the PVA solution with a mass ratio of tragacanthin to PVA between 70 to 30 and 90 to 10.

8. The method of claim 7, wherein obtaining the PVA solution further comprises adding formic acid to the distilled water.

9. The method of claim 2, wherein electrospinning the PAN solution onto the stainless steel mesh comprises electrospinning the PAN solution from an electrospinning nozzle with a flow rate between 0.025 mLhr$^{-1}$ and 0.25 mLhr$^{-1}$ onto the stainless steel mesh, the stainless steel mesh positioned at a distance between 5 cm and 15 cm from a tip of the electrospinning nozzle, a voltage between 10 kV and 15 kV applied between the electrospinning nozzle and the stainless steel mesh.

10. The method of claim 2, wherein electrospinning the homogenized homogenous tragacanthin-PVA solution onto the support layer comprises electrospinning the homogenous tragacanthin-PVA solution from an electrospinning nozzle with a flow rate between 0.025 mLhr$^{-1}$ and 0.125 mLhr$^{-1}$ onto the support layer, the support layer positioned at a distance between 7 and 17 cm from a tip of the electrospinning nozzle, a voltage between 10 and 20 kV applied between the electrospinning nozzle and the support layer.

11. The method of claim 2, wherein exposing the tragacanthin-PVA nanofibrous web to the saturated vapor of a cross-linking agent comprises putting the tragacanthin-PVA nanofibrous web in contact with the saturated vapor of the cross-linking agent, the cross-linking agent comprising glutaraldehyde.

12. A method for fabricating a filter containing tragacanthin-polyvinyl alcohol (PVA) nanofibers, the method comprising:
    obtaining a homogenous tragacanthin-PVA solution by:
        obtaining a PVA solution by dissolving PVA in distilled water; and
        adding tragacanthin to the PVA solution, a concentration of tragacanthin in the homogenous tragacanthin-PVA solution being between 1 w/v % and 1.7 w/v %;
    obtaining a support layer by coating a stainless steel mesh with a thin layer of a hydrophobic polymer, the coating a stainless steel mesh with the thin layer of the hydrophobic polymer comprising electrospinning a hydrophobic polymer solution onto the stainless steel mesh;
    forming a tragacanthin-PVA nanofibrous web on the support layer by electrospinning the homogenous tragacanthin-PVA solution onto the support layer; and
    cross-linking the tragacanthin-PVA nanofibrous web by exposing the tragacanthin-PVA nanofibrous web to a saturated vapor of a cross-linking agent.

13. A method for fabricating a filter containing tragacanthin-polyvinyl alcohol (PVA) nanofibers, the method comprising:
    obtaining a homogenous tragacanthin-PVA solution by adding tragacanthin to a PVA solution, a concentration of tragacanthin in the homogenous tragacanthin-PVA solution being between 1 w/v % and 1.7 w/v %;
    forming a tragacanthin-PVA nanofibrous web on a support layer; and
    cross-linking the tragacanthin-PVA nanofibrous web by exposing the tragacanthin-PVA nanofibrous web to a saturated vapor of a cross-linking agent.

14. The method of claim 13, wherein the support layer comprises a stainless steel mesh with a thin layer of a hydrophobic polymer coated onto the stainless steel mesh.

15. The method of claim 14, wherein forming a tragacanthin-PVA nanofibrous web on a support layer comprises electrospinning the homogenous tragacanthin-PVA solution onto the support layer.

16. The method of claim 15, wherein obtaining a homogenous tragacanthin-PVA solution by adding tragacanthin to a PVA solution comprises:
    obtaining a PVA solution by dissolving PVA in a solvent; and
    adding tragacanthin to the PVA solution.

17. The method of claim 16, wherein the solvent comprises distilled water, ethyl acetate, acetic acid, and formic acid.

* * * * *